US 8,752,573 B2

(12) United States Patent
Nishimura et al.

(10) Patent No.: US 8,752,573 B2
(45) Date of Patent: Jun. 17, 2014

(54) NON-AQUEOUS ELECTROLYTE SECONDARY BATTERY WITH FILLING FUNCTION, AND NON-AQUEOUS ELECTROLYTE SECONDARY BATTERY AND NON-AQUEOUS ELECTROLYTE FILLING DEVICE USED THEREFOR

(75) Inventors: Naoto Nishimura, Osaka (JP); Kazuya Sakashita, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 685 days.

(21) Appl. No.: 12/917,972

(22) Filed: Nov. 2, 2010

(65) Prior Publication Data
US 2011/0108134 A1 May 12, 2011

(30) Foreign Application Priority Data

Nov. 6, 2009 (JP) .................................. 2009-254748
Nov. 12, 2009 (JP) .................................. 2009-258952

(51) Int. Cl.
*H01M 2/36* (2006.01)
*H01M 10/05* (2010.01)
*H01M 10/0525* (2010.01)

(52) U.S. Cl.
CPC .............. *H01M 10/05* (2013.01); *H01M 2/365* (2013.01); *H01M 2/361* (2013.01); *H01M 10/0525* (2013.01); *Y02E 60/12* (2013.01)
USPC ........................................................ 137/260

(58) Field of Classification Search
None
See application file for complete search history.

(56) References Cited

U.S. PATENT DOCUMENTS

| 3,684,581 | A | | 8/1972 | Jufer | |
| 3,744,516 | A | * | 7/1973 | Rowe | 137/587 |
| 5,718,989 | A | * | 2/1998 | Aoki et al. | 429/223 |
| 6,248,138 | B1 | | 6/2001 | Lafave et al. | |
| 7,004,207 | B2 | * | 2/2006 | Finkelshtain et al. | 141/2 |
| 2009/0023049 | A1 | * | 1/2009 | Yamamura et al. | 429/38 |
| 2009/0242073 | A1 | * | 10/2009 | Reschke | 141/7 |

FOREIGN PATENT DOCUMENTS

| CN | 2316659 Y | 4/1999 |
| CN | 101552356 A | 10/2009 |
| JP | 02-90455 | 3/1990 |
| JP | 11-149937 | 6/1999 |
| JP | 11-213985 | 8/1999 |
| JP | 2000-208133 | 7/2000 |
| JP | 2001-210309 | 8/2001 |

* cited by examiner

*Primary Examiner* — Patrick Ryan
*Assistant Examiner* — Christopher Domone
(74) *Attorney, Agent, or Firm* — Nixon & Vanderhye P.C.

(57) ABSTRACT

A secondary battery with filling function has a corresponding secondary battery and a filling device. The corresponding secondary battery has a housing defining an accommodation chamber for accommodating a power generation portion, an opening portion formed in the housing, a stopper body closing the opening portion, and a coupling portion formed around the opening portion. The filling device has a cap body forming a sealed space around the opening portion by covering the opening portion and the stopper body closing the opening portion as a result of coupling to the coupling portion, an attachment and removal portion for attaching and removing the stopper body to/from the opening portion in the sealed space, and a filling portion for filling the inside of the housing with a non-aqueous electrolyte through the opened opening portion.

7 Claims, 14 Drawing Sheets

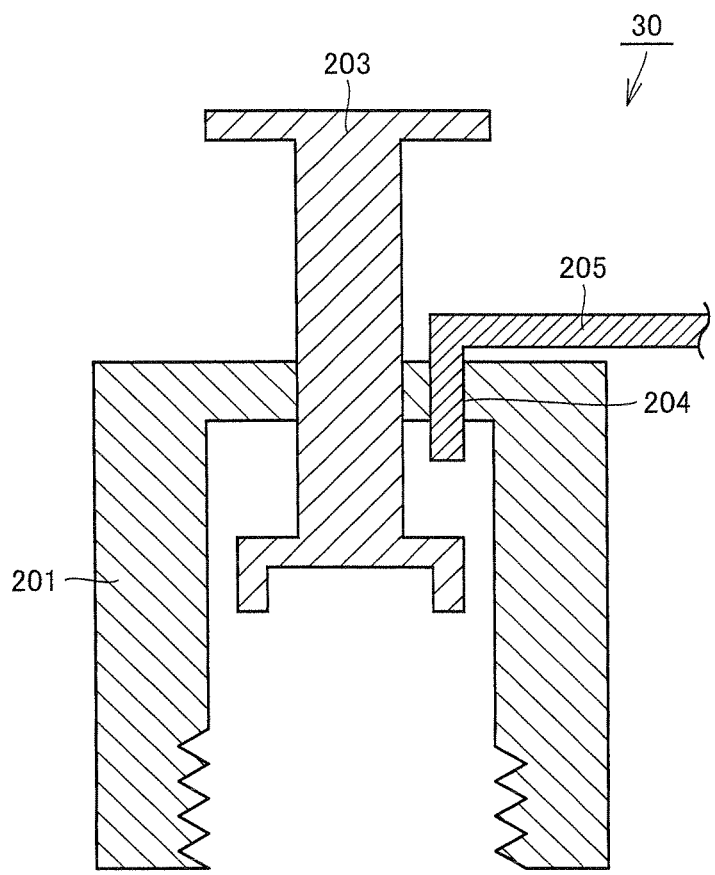

NON-AQUEOUS ELECTROLYTE SECONDARY BATTERY WITH FILLING FUNCTION, AND NON-AQUEOUS ELECTROLYTE SECONDARY BATTERY AND NON-AQUEOUS ELECTROLYTE FILLING DEVICE USED THEREFOR

This nonprovisional application is based on Japanese Patent Applications Nos. 2009-254748 and 2009-258952 filed with the Japan Patent Office on Nov. 6 and 12, 2009, respectively, the entire contents of which are hereby incorporated by reference.

BACKGROUND OF THE INVENTION

1. Field of the Invention

The present invention relates to a non-aqueous electrolyte secondary battery with filling function (hereinafter referred to as a "secondary battery with filling function"), as well as a non-aqueous electrolyte secondary battery (hereinafter referred to as a "corresponding secondary battery") and a non-aqueous electrolyte filling device (hereinafter referred to as a "filling device") used therefor, and particularly to a secondary battery with filling function capable of being refilled with a non-aqueous electrolyte in a low humidity environment as well as a corresponding secondary battery and a filling device used therefor.

2. Description of the Background Art

A non-aqueous electrolyte secondary battery such as a lithium ion secondary battery has a high voltage and high energy density and it is superior in reliability such as storage capability and resistance to leakage. Therefore, the non-aqueous electrolyte secondary battery has already been put into practical use as a small-sized power supply in a portable telephone, a notebook personal computer and the like, and medium- or large-scale applications thereof such as automobile applications or power storage applications have also been attempted.

Examples of a positive electrode active material for the lithium ion secondary battery include not only titanium disulfide, vanadium pentoxide and molybdenum trioxide but also various compounds expressed by a general formula $Li_xMO_2$ (M being one or more type of transition metal), such as lithium cobalt composite oxide, lithium nickel composite oxide and spinel-type lithium manganese oxide.

Examples of a negative electrode active material for the lithium ion secondary battery include not only metal lithium and an alloy containing lithium but also various materials such as carbon materials capable of occluding and releasing lithium. In particular, use of a carbon material as a negative electrode active material is advantageous in that a battery having long cycle life is obtained and high safety is achieved.

In general, an electrolytic solution obtained by dissolving a supporting electrolyte such as $LiPF_6$ or $LiBF_4$ in a mixture-type solvent of a solvent having a high dielectric constant such as ethylene carbonate or propylene carbonate and a low-viscosity solvent such as diethyl carbonate is employed as a non-aqueous electrolyte for the lithium ion secondary battery.

The lithium ion secondary battery so far is of a sealed type and it also has long charge and discharge cycle life. Therefore, if the lithium ion secondary battery is used prescribed number of times and its discharge capacity has significantly lowered, it was determined that the battery life had expired and the battery was disposed of. The lithium ion secondary battery that had been disposed of has been recovered and a material that can be used has been extracted for recycling.

It has been difficult, however, to recycle 100% of materials making up the battery, and it has been demanded to conceive a method of effectively utilizing a battery of which life had expired. In the case of the lithium ion secondary battery for medium- or large-scale applications as described above, life of 10 to 20 years and charge and discharge cycle life of several thousand to several ten thousand cycles may be required.

However, it is difficult to achieve such long life with a conventional battery configuration.

In order to address this, for example, Japanese Patent Laying-Open No. 2001-210309 proposes a lithium ion secondary battery in which an inlet port stopper is provided in a battery container in order to recover discharge capacity by refilling the lithium ion secondary battery of which discharge capacity has lowered due to repeated charge and discharge cycles with a new non-aqueous electrolyte.

The non-aqueous electrolyte, however, should be handled in a low-humidity environment, and for example, it is handled in such facilities as a glove box of which humidity is controlled. Therefore, in general, in refilling a lithium ion secondary battery with a non-aqueous electrolyte, the lithium ion secondary battery had to be moved into the facilities above and an operation has been complicated.

In addition, since a lithium ion secondary battery used for power storage applications or automobile applications has a large size, an operation within such facilities as a glove box or loading the lithium ion secondary battery into the glove box may be difficult. Therefore, it is difficult to fill the medium- or large-sized lithium ion secondary battery with the non-aqueous electrolyte in a low-humidity environment.

Moreover, as compared with a small-sized lithium ion secondary battery used in a portable phone or a personal computer, with regard to a lithium ion secondary battery for power storage or for automobiles having a medium or large size and desired to have longer life, lowering in capacity retention due to exhaustion of a solution is a serious and unignorable problem.

SUMMARY OF THE INVENTION

From the foregoing, an object of the present invention is to provide a secondary battery with filling function capable of being refilled with a non-aqueous electrolyte in a low-humidity environment in a simplified manner as well as a corresponding secondary battery and a filling device used therefor.

The present invention is directed to a secondary battery with filling function including: a corresponding secondary battery having a housing defining an accommodation chamber for accommodating a power generation portion having a positive electrode, a negative electrode, a separator, and a non-aqueous electrolyte, an opening portion formed in the housing, a stopper body closing the opening portion, and a coupling portion formed around the opening portion on an outer surface side of the housing; and a filling device having a cap body forming a sealed space around the opening portion by covering the opening portion and the stopper body closing the opening portion from the outer surface side of the housing as a result of coupling to the coupling portion, an attachment and removal portion for opening the opening portion by moving the stopper body from the opening portion and closing the opening portion by moving the stopper body to the opening portion in the sealed space, and a filling portion for filling inside of the housing with the non-aqueous electrolyte through the opened opening portion.

In the secondary battery with filling function according to the present invention, preferably, the attachment and removal portion has a support shaft portion slidably passing through the cap body, one end of the support shaft portion has a structure that is located on an inner surface side of the cap body defining the sealed space and can be coupled to the stopper body, and the other end of the support shaft portion is located on an outer surface side of the cap body.

In the secondary battery with filling function according to the present invention, the filling portion may also serve as an exhaust portion capable of replacing a gas within the sealed space, and the secondary battery with filling function may include an exhaust portion capable of replacing a gas within the sealed space.

In the secondary battery with filling function according to the present invention, the coupling portion and the cap body are preferably screwed to each other, and the coupling portion and the cap body may integrally be formed.

In the secondary battery with filling function according to the present invention, preferably, a portion of the housing defining the opening portion and the stopper body are screwed to each other.

In addition, the present invention is directed to a corresponding secondary battery including: a housing defining an accommodation chamber for accommodating a power generation portion having a positive electrode, a negative electrode, a separator, and a non-aqueous electrolyte; an opening portion formed in the housing; a stopper body closing the opening portion; and a coupling portion formed around the opening portion on an outer surface side of the housing and forming a sealed space around the opening portion as a result of coupling to a cap body covering the opening portion and the stopper body closing the opening portion from an outer surface side of the housing.

In addition, the present invention is directed to a filling device for a corresponding secondary battery including a housing defining an accommodation chamber for accommodating a power generation portion having a positive electrode, a negative electrode, a separator, and a non-aqueous electrolyte, an opening portion formed in the housing, a stopper body closing the opening portion, and a coupling portion formed around the opening portion on an outer surface side of the housing, and the filling device includes: a cap body coupled to the coupling portion so as to form a sealed space around the opening portion by covering the opening portion and the stopper body closing the opening portion from an outer side of the housing; an attachment and removal portion for opening the opening portion by moving the stopper body from the opening portion and closing the opening portion by moving the stopper body to the opening portion in the sealed space; and a filling portion for filling the sealed space with the non-aqueous electrolyte.

In the filling device according to the present invention, preferably, the attachment and removal portion has a support shaft portion slidably passing through the cap body, one end of the support shaft portion has a structure that is located on an inner surface side of the cap body defining the sealed space and can be coupled to the stopper body, and the other end of the support shaft portion is located on an outer, surface side of the cap body.

In addition, the present invention is directed to a secondary battery with filling function including: a housing having an accommodation chamber for accommodating a power generation portion having a positive electrode, a negative electrode, a separator, and a non-aqueous electrolyte, an opening portion communicating with the accommodation chamber, and a sub accommodation chamber communicating with the accommodation chamber through the opening portion, for accommodating a refill non-aqueous electrolyte; and a stopper body structured to removably be attached to the opening portion from an outer side of the housing.

In the secondary battery with filling function according to the present invention, preferably, a sub opening portion causing the sub accommodation chamber and outside of the housing to communicate with each other is formed in a portion of the housing defining the sub accommodation chamber, and a part of the stopper body is removably fitted to the opening portion and another part of the stopper body is exposed to the outside of the housing through the sub opening portion.

In the secondary battery with filling function according to the present invention, preferably, the opening portion and the sub opening portion are opposed to each other.

In the secondary battery with filling function according to the present invention, a portion of the housing defining the opening portion and the stopper body are preferably screwed to each other, and in addition, a portion of the housing defining the sub opening portion and the stopper body are preferably screwed to each other.

In the secondary battery with filling function according to the present invention, preferably, a supply portion for filling the sub accommodation chamber with the refill non-aqueous electrolyte from outside of the housing is formed in a portion of the housing defining the sub accommodation chamber.

In the secondary battery with filling function according to the present invention, preferably, the supply portion has a supply port portion communicating with the sub accommodation chamber to cause the sub accommodation chamber and the outside of the housing to communicate with each other and a supply port stopper body removably fitted to the supply port portion.

In the secondary battery with filling function according to the present invention, preferably, a portion of the housing defining the supply port portion and the supply port stopper body are screwed to each other.

According to the present invention, refill with a non-aqueous electrolyte can be carried out in a low-humidity environment in a simplified manner.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a schematic cross-sectional view of a filling device according to a third embodiment.

DESCRIPTION OF THE PREFERRED EMBODIMENTS

Figure 1:
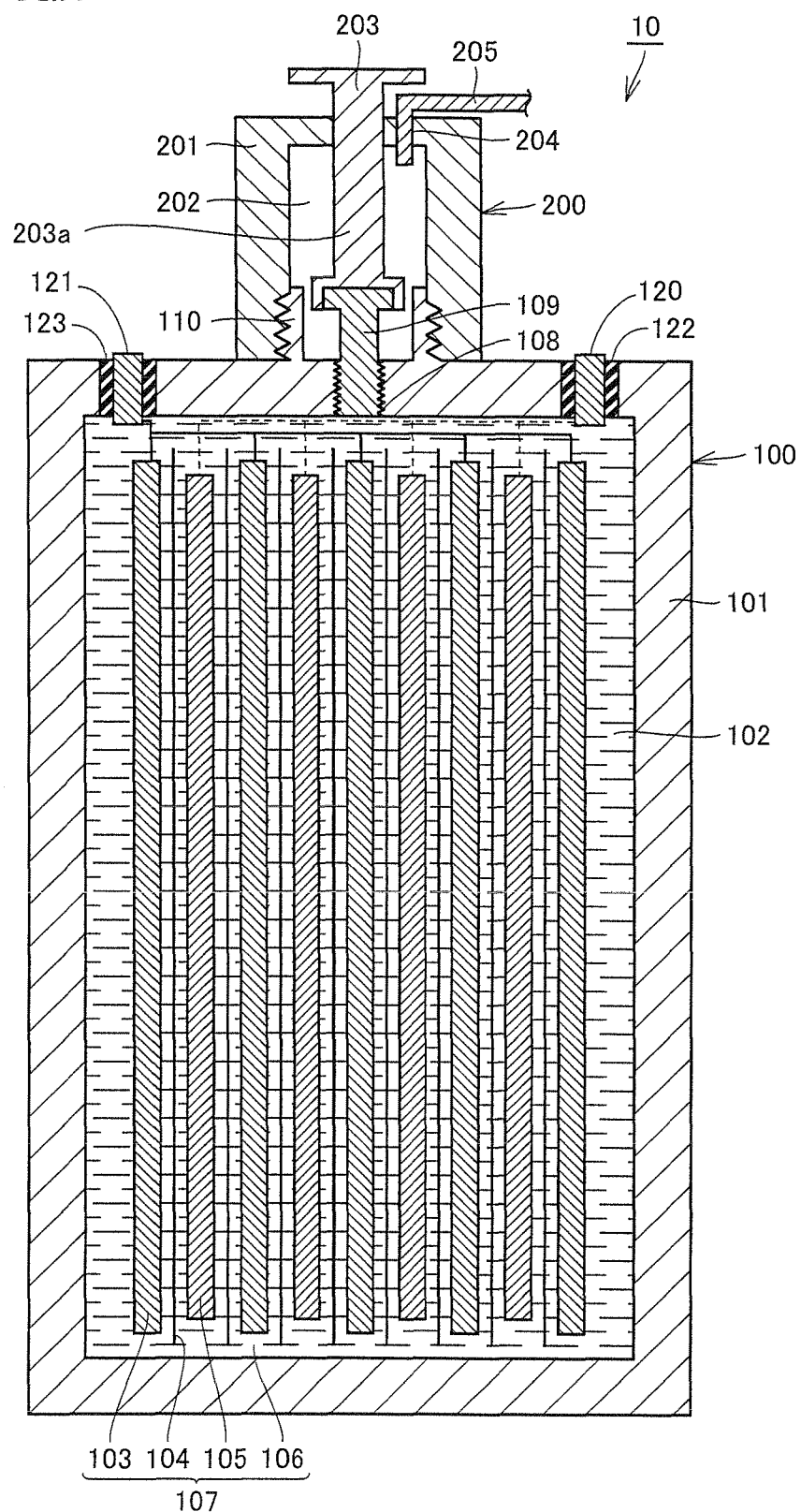
FIG. 1 is a schematic cross-sectional view of a secondary battery with filling function according to a first embodiment.

An embodiment of the present invention will be described hereinafter in detail with reference to the drawings. In the embodiments shown below, the same or corresponding elements have the same reference characters allotted and description thereof will not be repeated.

First Embodiment

The first embodiment relates to a secondary battery with filling function including a corresponding secondary battery and a filling device.

<<Structure of Secondary Battery with Filling Function>>

A secondary battery with filling function according to the present embodiment will be described with reference to FIG. 1. In the present embodiment, a prismatic, stack-type lithium ion secondary battery with filling function is employed. FIG. 1 is a cross-sectional view of the secondary battery with filling function according to the first embodiment.

In FIG. 1, a lithium ion secondary battery with non-aqueous electrolyte filling function (hereinafter referred to as a "secondary battery with filling function") 10 includes a lithium ion secondary battery (hereinafter referred to as a "corresponding secondary battery") 100 and a non-aqueous electrolyte filling device (hereinafter referred to as a "filling device") 200. A structure of each of corresponding secondary battery 100 and non-aqueous electrolyte filling device 200 will be described hereinafter in detail.

1. Corresponding Secondary Battery

Corresponding secondary battery 100 has a housing 101, and sets of a positive electrode 105, a separator 104 and a negative electrode 103 as stacked in this order are accommodated in an accommodation chamber 102 within housing 101. In addition, accommodation chamber 102 is filled with a non-aqueous electrolyte 106. Positive electrode 105, separator 104, negative electrode 103, and non-aqueous electrolyte 106 constitute a power generation portion 107.

In addition, housing 101 is provided with a positive electrode terminal 120 and a negative electrode terminal 121 penetrating to the inside and the outside of housing 101, and insulating members 122 and 123 are provided such that they are interposed between positive electrode terminal 120 and housing 101 and between negative electrode terminal 121 and housing 101, respectively. Each positive electrode 105 is connected to positive electrode terminal 120 through a positive electrode current collection lead shown with a dotted line in the figure, and each negative electrode 103 is connected to negative electrode terminal 121 through a negative electrode current collection lead shown with a solid line in the figure.

Positive electrode 105 has such a structure that a positive electrode active substance material is formed on a surface of a current collector. Composite oxide of lithium and a transition metal that is generally used in a lithium ion secondary battery can be used as the positive electrode active substance material. The composite oxide of lithium and a transition metal includes such types as a spinel type, a NASICON type and an olivine type. Among others, lithium transition metal oxide expressed as $Li_xMPO_4$ having an olivine-type structure (X being a positive number and M representing one or more type of transition metal) is high in thermal stability during charging of the lithium ion secondary battery.

Therefore, in using a large-capacity lithium ion secondary battery of which safety should particularly be high, a compound having an olivine-type structure is preferably used as a material for positive electrode 105. More specifically, lithium iron phosphate with which decomposition of a non-aqueous electrolyte is less likely and high stability is achieved is preferably used.

Separator 104 plays a role to prevent internal short-circuiting by isolating positive electrode 105 and negative electrode 103 from each other and to maintain ionic conduction between the positive and negative electrodes by holding non-aqueous electrolyte 106 which is an electrolytic solution. A microporous membrane based on polyolefin such as polyethylene and polypropylene can be used as a material for separator 104. Alternatively, an unwoven fabric made of glass fibers, aramid fibers or cellulose fibers may be employed. Such an unwoven fabric has high thermal stability and thus can improve safety of a battery.

Negative electrode 103 has such a structure that a negative electrode active substance material is formed on a surface of a current collector. A material generally used for the lithium ion secondary battery can be used as the negative electrode active substance material. In particular, a carbon-based material such as graphite excellent in reversibility is preferably employed.

Non-aqueous electrolyte 106 is an electrolytic solution composed of a non-aqueous type organic solvent and lithium salt, which is a lithium ion conductor, and for example, a substance obtained by dissolving $LiPF_6$ in ethylene carbonate, diethyl carbonate or the like can be used. The electrolytic solution may have viscosity.

In housing 101 accommodating power generation portion 107 described above, an opening portion 108 causing accommodation chamber 102 and the outside of housing 101 to communicate with each other is formed, and opening portion 108 is closed by a stopper body 109.

In an operation for filling with a refill non-aqueous electrolyte which will be described later, stopper body 109 should be removed from a portion of housing 101 defining opening portion 108 (hereinafter referred to as an "opening wall portion") and then stopper body 109 should be inserted in the opening wall portion. Therefore, in housing 101, a surface where opening portion 108 is formed preferably has an area not smaller than 8 cm². If the surface of housing 101 where opening portion 108 is formed has an area not smaller than 8 cm², it is not necessary to make opening portion 108 and stopper body 109 closing opening portion 108 too small, which is preferred not only in terms of cost but also in terms of operability in a filling operation. If the surface where opening portion 108 is formed has an area smaller than 8 cm², an area for forming a coupling portion 110 for coupling to a cap body 201 which will be described later may be insufficient and housing 101 may be unable to keep sufficient strength. The surface where opening portion 108 is formed more preferably has an area not smaller than 10 cm$^2$.

More specifically, in an example where housing 101 is prismatic, two adjacent sides of the surface of housing 101 where opening portion 108 is formed preferably have a length not shorter than 1 cm. In an example where housing 101 is cylindrical, the surface of housing 101 where opening portion 108 is formed preferably has a diameter not smaller than 1 cm. Though a position in housing 101 where opening portion 108 is formed is not particularly limited, opening portion 108 is preferably formed in a flat portion of housing 101. A material for housing 101 is not particularly limited, and for example, iron, iron plated with nickel, stainless steel, or aluminum can be employed.

A shape of the opening wall portion constituting opening portion 108 and a shape of stopper body 109 are not particularly restricted, and any coupling structure for isolating accommodation chamber 102 from the outside should only be provided. For example, as shown in FIG. 1, a helical groove is preferably formed at a position where the opening wall portion and stopper body 109 come in contact with each other. Each of the opening wall portion and stopper body 109 has the helical groove so that screwing to each other can be achieved and hence accommodation chamber 102 can readily be isolated from the outside of housing 101. Alternatively, the opening wall portion and stopper body 109 may have an oblique groove instead of the helical groove, and any shape allowing removable fitting to each other should only be adopted.

In an example where the opening wall portion and stopper body 109 are screwed to each other, the opening wall portion preferably has a thickness not smaller than 1.5 mm. If the opening wall portion has a thickness not smaller than 1.5 mm, stopper body 109 in a screw shape can firmly be screwed to the opening wall portion and a hermetic state in accommodation chamber 102 can readily be maintained.

Normally, in the lithium ion secondary battery, in case that an internal pressure of the battery is raised at the time of overcharging or at a high temperature, a safety valve for relieving the internal pressure of the battery is provided in order to avoid such risks as explosion of the battery. In the case where corresponding secondary battery 100 includes a safety valve, it is necessary to avoid removal of stopper body 109 from the opening wall portion until the safety valve is actuated. Therefore, if a safety valve is provided, stopper body 109 closing opening portion 108 is structured such that its withstand pressure is not lower than an operating pressure of the safety valve. It is noted that the withstand pressure herein refers to a pressure up to which stopper body 109 is not removed from the opening wall portion.

Figure 2:
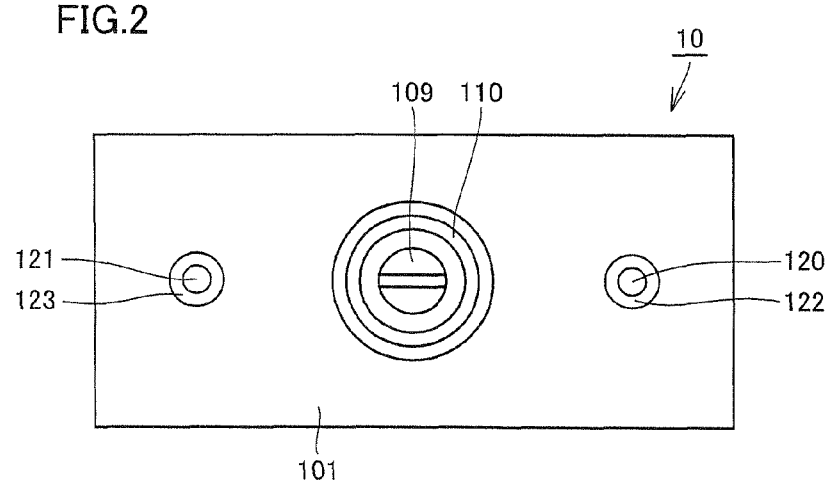
FIG. 2 is a schematic diagram of a corresponding secondary battery according to the first embodiment when viewed from above.

In addition, corresponding secondary battery 100 further has coupling portion 110 formed on the outer surface side of housing 101. FIG. 2 is a schematic diagram of the corresponding secondary battery according to the first embodiment when viewed from above.

In FIG. 2, coupling portion 110 is formed on the outer surface side of housing 101, so as to surround opening portion 108 (stopper body 109). As coupling portion 110 is coupled to cap body 201 which will be described later, it can form a sealed space 202 (see FIG. 1) isolated from an external environment, around opening portion 108 and stopper body 109 closing opening portion 108.

It is not necessary to provide coupling portion 110 around the entire circumference of stopper body 109, and the structure should only be such that sealed space 202 can be formed around stopper body 109 as a result of coupling between coupling portion 110 and cap body 201 which will be described later. Though a groove is formed in a head portion of stopper body 109 in FIG. 2, the head portion of stopper body 109 is not particularly limited, and for example, it may have a hexagonal shape.

2. Filling Device

In FIG. 1, filling device 200 of secondary battery with filling function 10 has cylindrical cap body 201 having one end closed, and an edge portion forming the other opening end of cap body 201 is coupled to coupling portion 110 of corresponding secondary battery 100. The shape of cap body 201 is not limited to the cylindrical shape as shown in FIG. 1, and any structure capable of forming sealed space 202 around opening portion 108 and stopper body 109 closing opening portion 108, between an inner surface side of cap body 201 and corresponding secondary battery 100, as a result of coupling to coupling portion 110, should only be provided.

A structure for coupling cap body 201 and coupling portion 110 to each other is not particularly limited, and any structure for coupling coupling portion 110 and cap body 201 in close contact with each other should only be provided. In particular, a helical groove is preferably formed at a position of contact between coupling portion 110 and cap body 201. Each of coupling portion 110 and cap body 201 has a helical groove so that coupling portion 110 and cap body 201 can be screwed to each other and hence sealed space 202 can readily be formed. Coupling portion 110 and cap body 201 may have an oblique groove instead of the helical groove.

Figure 3:
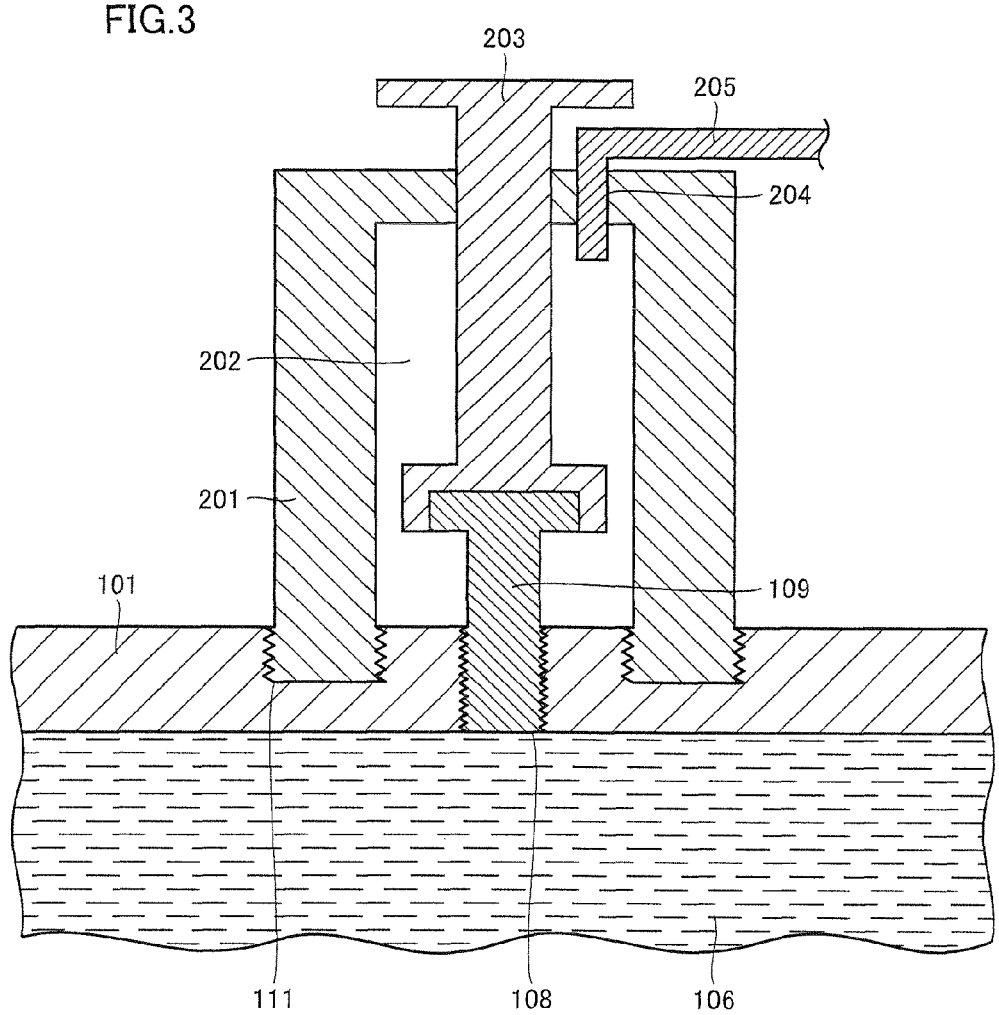
FIG. 3 is a schematic diagram showing an exemplary coupling structure of a coupling portion and a cap body.

Though an outer circumferential surface of coupling portion 110 is coupled to an inner circumferential surface of cap body 201 in FIG. 1, an inner circumferential surface of coupling portion 110 may be coupled to an outer circumferential surface of cap body 201. Alternatively, as shown in FIG. 3, cap body 201 may be coupled to a coupling portion 111 formed on an outer surface side of housing 101. Alternatively, coupling portion 110 and cap body 201 may integrally be formed.

Referring back to FIG. 1, filling device 200 further includes an attachment and removal portion 203 for attaching/removing stopper body 109 to/from the opening wall portion. Attachment and removal portion 203 is structured to be able to couple to stopper body 109 in sealed space 202 formed as a result of coupling between cap body 201 and coupling portion 110. As attachment and removal portion 203 moves coupled stopper body 109 upward in the figure to remove stopper body 109 from the opening wall portion, opening portion 108 can be opened. Alternatively, as attachment and removal portion 203 moves coupled stopper body 109 downward from above in the figure to insert stopper body 109 in the opening wall portion, opening portion 108 can be closed.

A structure of attachment and removal portion 203 may be any structure capable of attaching/removing stopper body 109 to/from the opening wall portion as a result of coupling to stopper body 109. For example, as shown in FIG. 1, preferably, a support shaft portion 203a of attachment and removal portion 203 passes through cap body 201 slidably in a vertical direction of the figure, one end thereof located on the inner surface side of cap body 201 has a shape allowing coupling to stopper body 109, and the other end thereof has a shape located on the outer surface side of cap body 201. According to such a structure, stopper body 109 coupled to attachment and removal portion 203 can readily be moved in the vertical direction in the figure, so that stopper body 109 can readily be removed from the opening wall portion or inserted in the opening wall portion and hence opening and closing of opening portion 108 is facilitated.

For example, a fitting structure or the like can be adopted for a structure for coupling attachment and removal portion 203 and stopper body 109 to each other. Alternatively, such a structure that stopper body 109 is made as a magnetic element and attachment and removal portion 203 attracts or repels stopper body 109 through magnetic action so as to remove/insert stopper body 109 from/in opening portion 108 may be adopted. In this case, a structure of a portion of connection between attachment and removal portion 203 and stopper body 109 can be simplified.

In addition, filling device 200 further includes a filling portion 204. Filling portion 204 should only be structured to be able to fill the inside of housing 101 with a non-aqueous electrolyte through opened opening portion 108. For example, it may be something like a hole causing sealed space 202 formed on the inner surface side of filling device 200 and the outside of non-aqueous electrolyte filling device 200 to communicate with each other. Here, for example, by inserting one end of a filling pipe 205 in filling portion 204 and carrying out filling with the non-aqueous electrolyte from the other end, filling of sealed space 202 with the non-aqueous electrolyte is allowed and consequently the inside of housing 101 can be filled with the non-aqueous electrolyte through opened opening portion 108.

If communication between sealed space 202 and the outside is not desired, filling portion 204 can be closed, for example, by using a stopper or the like. Alternatively, filling portion 204 may be a hole with a cap or a pipe with a cap. In addition, sealed space 202 may be dehumidified by connecting an exhaust system, a dehumidifier or the like to filling portion 204. Here, filling portion 204 can also serve as an exhaust portion.

Figure 4:
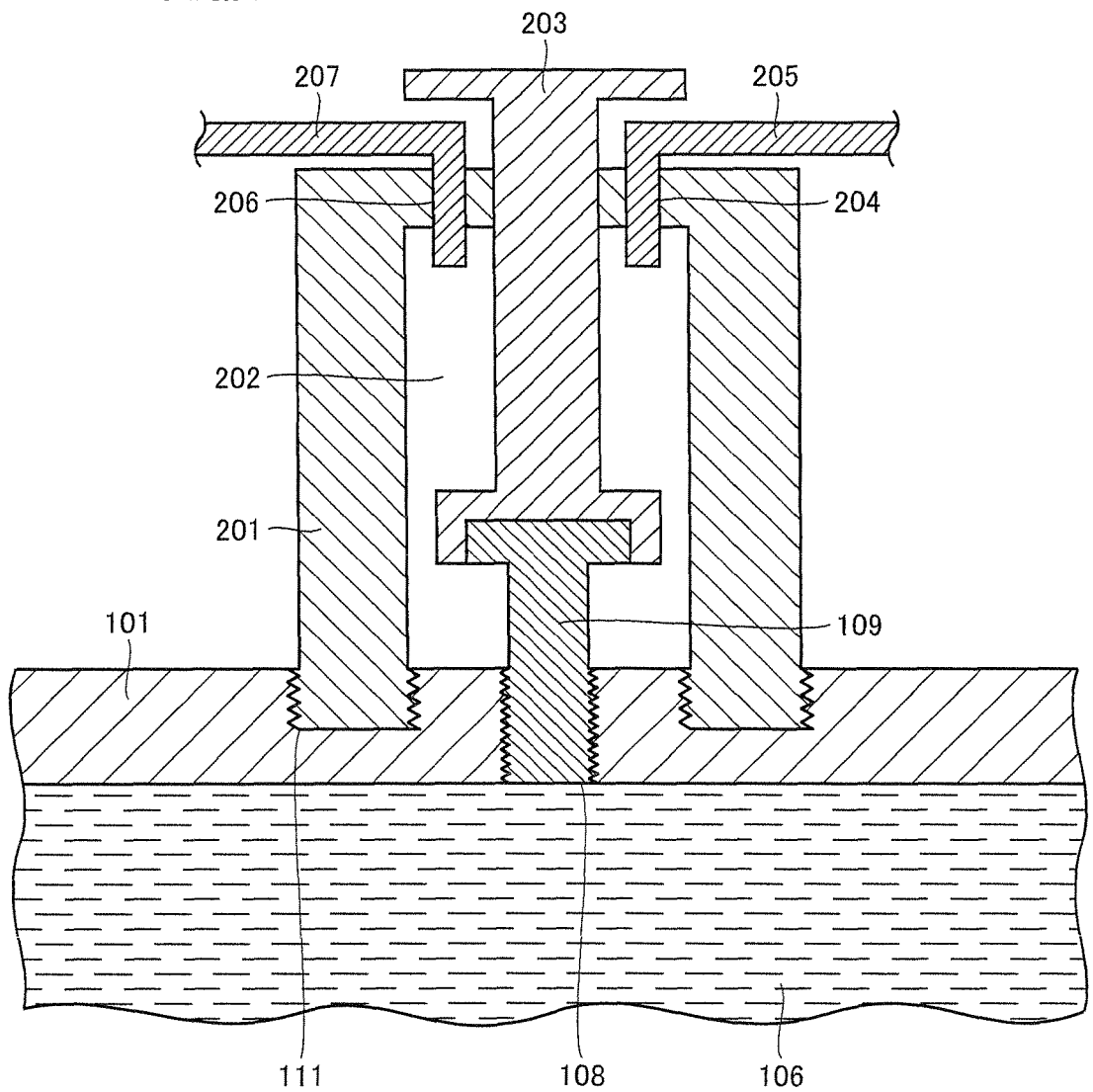
FIG. 4 is a schematic diagram showing a structure of the secondary battery with filling function in which an exhaust portion is provided in the cap body.

Further, filling device 200 may separately include an exhaust portion 206 as shown in FIG. 4. Exhaust portion 206 should only be structured to be able to replace a gas within sealed space 202, and for example, it may be something like a hole causing sealed space 202 formed on the inner surface side of filling device 200 and the outside of filling device 200 to communicate with each other, as in the case of filling portion 204. Here, if communication between sealed space 202 and the outside is not desired, exhaust portion 206 can be closed, for example, by using a stopper or the like. Alternatively, exhaust portion 206 may be a hole with a cap or a pipe with a cap. A gas within the sealed space can be dehumidified by inserting one end of an exhaust pipe 207 in exhaust portion 206 and coupling the other end of exhaust pipe 207 to a dehumidifier having a dehumidifying function.

<<Operation for Filling with Refill Non-Aqueous Electrolyte>>

An operation for filling with a refill non-aqueous electrolyte using secondary battery with filling function 10 described above will be described with reference to FIGS. 5A to 5C.

Figure 5A:
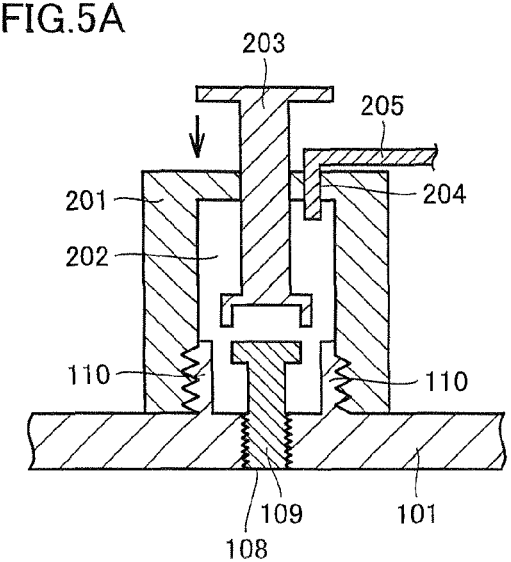
FIGS. 5A to 5C are diagrams for illustrating an operation for filling the secondary battery with filling function according to the first embodiment with a refill non-aqueous electrolyte.
Figure 5B:
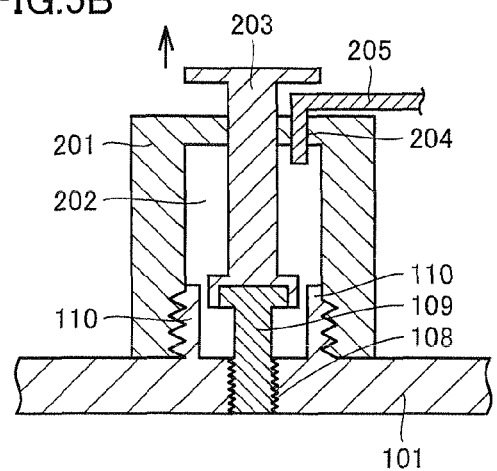
Figure 5C:
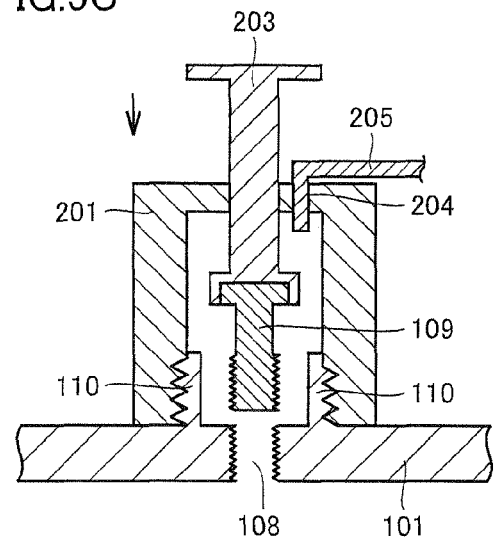

FIGS. 5A to 5C are diagrams for illustrating the operation for filling the secondary battery with filling function according to the first embodiment with the refill non-aqueous electrolyte.

Initially, attachment and removal portion 203 is moved from the state shown in FIG. 5A in a direction of an arrow in the figure. As attachment and removal portion 203 moves in the direction of arrow in the figure and a portion of attachment and removal portion 203 to be coupled to stopper body 109 reaches stopper body 109, attachment and removal portion 203 and stopper body 109 are coupled to each other as shown in FIG. 5B.

Then, while attachment and removal portion 203 and stopper body 109 are coupled to each other, attachment and removal portion 203 is turned and moved in a direction of an arrow in the figure from the state shown in FIG. 5B. Thus, as in a state shown in FIG. 5C, stopper body 109 is removed from the opening wall portion to open opening portion 108, and hence accommodation chamber 102 and sealed space 202 communicate with each other.

Then, by carrying out filling with the refill non-aqueous electrolyte from the other end of filling pipe 205 which is not shown, sealed space 202 can be filled with the non-aqueous electrolyte. Accommodation chamber 102 is filled with the non-aqueous electrolyte through opening portion 108 and power generation portion 107 is refilled therewith.

After filling with the non-aqueous electrolyte is completed, attachment and removal portion 203 is turned and moved in a direction of an arrow in the figure from the state shown in FIG. 5C and stopper body 109 is inserted in the opening wall portion, so that opening portion 108 is closed and sealed space 202 and accommodation chamber 102 are isolated from each other. Through the operation above, secondary battery with filling function 10 can be refilled without the non-aqueous electrolyte being exposed to an external environment, that is, in a low-humidity environment.

In a general non-aqueous electrolyte secondary battery, there is no concept of external refill with a non-aqueous electrolyte, and external refill with the non-aqueous electrolyte could not be carried out when a discharge capacity lowered due to what is called exhaustion of a solution in which the non-aqueous electrolyte decreases. In addition, a battery should be manufactured in such an environment that a dew point temperature is not higher than −40° C. and an amount of moisture is not greater than 0.013%, and a low-humidity environment is required also in refill with the non-aqueous electrolyte. Such a requirement could not be met naturally by a general non-aqueous electrolyte secondary battery and even by a structure of a lithium ion secondary battery disclosed in Japanese Patent Laying-Open No. 2001-210309.

In contrast, according to the first embodiment, a portion around opening portion 108 allowing communication between the inside and the outside of accommodation chamber 102 can be isolated from an external environment. Therefore, the refill non-aqueous electrolyte is not exposed to high humidity (external environment) and therefore refill with the non-aqueous electrolyte can be carried out in a low-humidity environment in a simplified manner.

In addition, even if secondary battery with filling function 10 is being used with filling device 200 having been removed, refill with the non-aqueous electrolyte can easily be carried out in a low-humidity environment by attaching and operating filling device 200 in an operation for filling with the refill non-aqueous electrolyte. By performing the filling operation described above after attachment of filling device 200, such a state that the refill non-aqueous electrolyte is exposed to high humidity during the operation for filling with the refill non-aqueous electrolyte can be avoided.

Moreover, in the first embodiment, by connecting a dehumidifier to the other end of filling pipe 205 having one end inserted in filling port 204 after the state as shown in FIG. 5A is attained during the refill operation, a gas within sealed space 202 can be dehumidified. It is noted that this operation may be performed in the state in FIG. 5A or in the state in FIG. 5B.

Figure 6A:
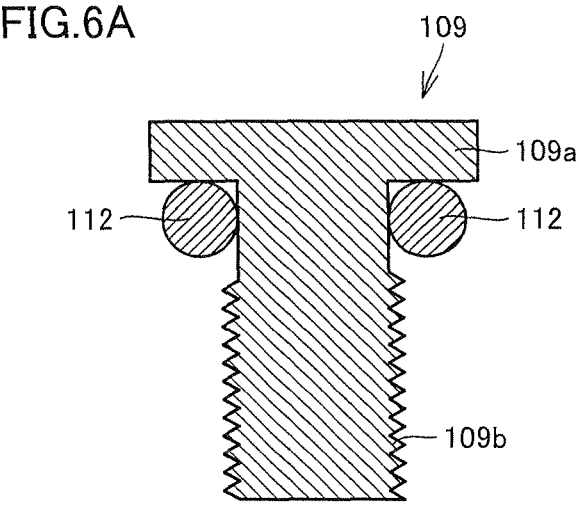
FIGS. 6A and 6B are diagrams for illustrating a shape of a sealing member included in a stopper body.
Figure 6B:
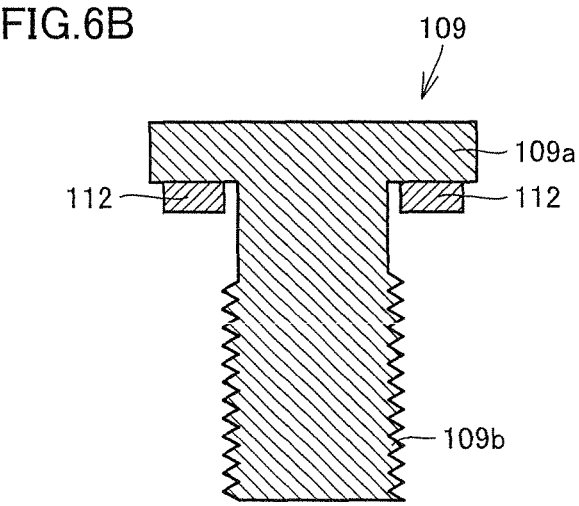

Further, in the first embodiment, in order to enhance hermeticity in accommodation chamber 102, corresponding secondary battery 100 preferably includes a sealing member for filling a gap between stopper body 109 and the opening wall portion. For example, as shown in FIGS. 6A and 6B, an O-ring shaped or rectangular sealing member 112 may be provided at a portion where a head portion 109a and a shaft portion 109b of stopper body 109 are coupled to each other.

Alternatively, sealing member 112 may be provided on a surface of housing 101 on the outer surface side, in the vicinity of opening portion 108.

A material resistant to a non-aqueous electrolyte which is an organic electrolytic solution, such as polypropylene (PP), polyethylene (PE), a copolymer of PP and PE, styrene-butadiene rubber, ethylene propylene diene monomer, butyl rubber, silicone rubber, fluoroplastic-containing rubber, or a Teflon® sealing tape made of polytetrafluoroethylene, is preferred for sealing member 112.

Second Embodiment

A second embodiment relates to a corresponding secondary battery to which a filling device can be attached.

<<Structure of Corresponding Secondary Battery>>

Figure 7:
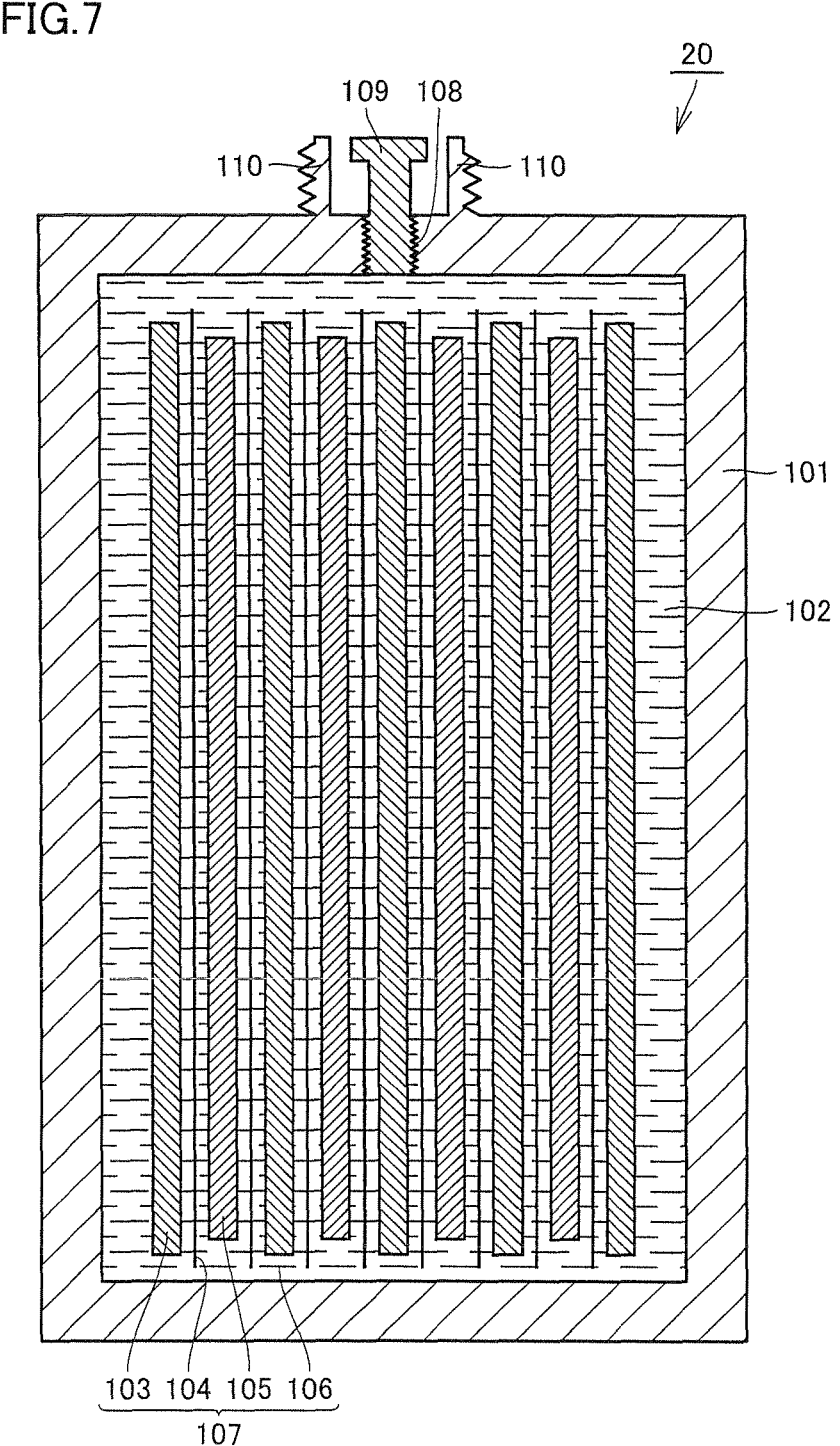
FIG. 7 is a schematic cross-sectional view of a corresponding secondary battery according to a second embodiment.

FIG. 7 is a schematic cross-sectional view of the corresponding secondary battery according to the second embodiment. It is noted that each insulating member, each terminal and each current collection lead are not shown in FIG. 7. Since a corresponding secondary battery 20 shown in FIG. 7 has a structure the same as that of corresponding secondary battery 100 of secondary battery with filling function 10 shown in FIG. 1, description will not be repeated.

<<Operation for Filling with Refill Non-Aqueous Electrolyte>>

An operation for filling with a refill non-aqueous electrolyte using corresponding secondary battery 20 described above will now be described with reference to FIGS. 8A and 8B and FIGS. 5A to 5C.

Figure 8A:
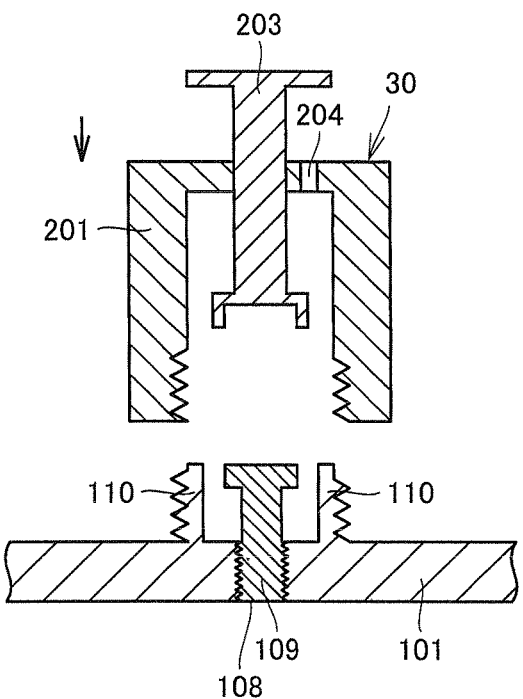
FIGS. 8A and 8B are diagrams for illustrating an operation for filling the corresponding secondary battery according to the second embodiment with a refill non-aqueous electrolyte.
Figure 8B:
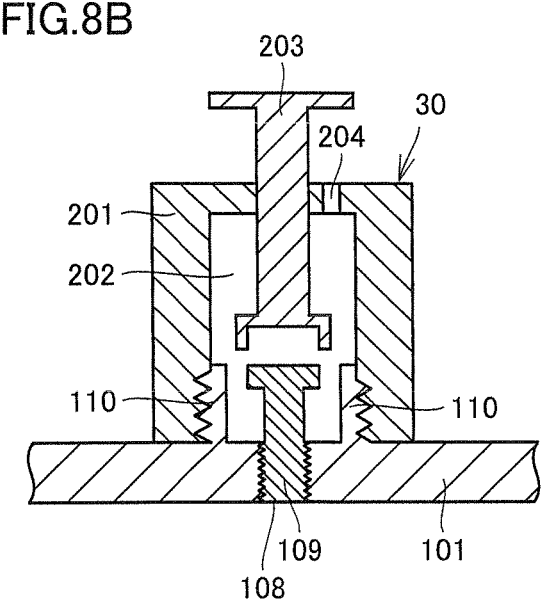

FIGS. 8A and 8B are diagrams for illustrating the operation for filling the corresponding secondary battery with the refill non-aqueous electrolyte according to the second embodiment.

Initially, as shown in FIG. 8A, a filling device 30 is attached to corresponding secondary battery 20 such that coupling portion 110 of corresponding secondary battery 20 and cap body 201 of filling device 30 which will be described later are coupled to each other. In FIG. 8A, cap body 201 is turned and moved in a direction of an arrow in the figure so that a helical groove of cap body 201 and a helical groove of coupling portion 110 are screwed to each other. However, a structure for coupling cap body 201 and coupling portion 110 to each other is not limited thereto.

Then, as shown in FIG. 8B, as cap body 201 and coupling portion 110 are completely screwed to each other, filling device 30 is attached to corresponding secondary battery 20 and sealed space 202 is formed within cap body 201. Then, corresponding secondary battery 20 can be filled with the refill non-aqueous electrolyte by inserting filling pipe 205 in filling portion 204 and thereafter performing the operation the same as in FIGS. 5A to 5C.

According to the second embodiment, before stopper body 109 is removed from the opening wall portion, sealed space 202 can be formed around opening portion 108 and stopper body 109, on the inner surface side of cap body 201. Thus, stopper body 109 can be removed from the opening wall portion within sealed space 202 and accommodation chamber 102 can be filled with the refill non-aqueous electrolyte without the refill non-aqueous electrolyte being exposed to the external environment. Therefore, exposure of the refill non-aqueous electrolyte to high humidity during the operation for filling with the refill non-aqueous electrolyte can be avoided and hence refill with the non-aqueous electrolyte can be carried out in a low-humidity environment.

Third Embodiment

A third embodiment relates to a filling device attached to a corresponding secondary battery.

<<Structure of Filling Device>>

FIG. 9 is a schematic cross-sectional view of a filling device according to the third embodiment. Since filling device 30 shown in FIG. 9 is structured similarly to filling device 200 in. FIG. 1, description will not be repeated. Filling device 30 is a filling device for filling corresponding secondary battery 20 with a refill non-aqueous electrolyte.

<<Operation for Filling Corresponding Secondary Battery with Refill Non-Aqueous Electrolyte>>

Since an operation for filling the corresponding secondary battery with the refill non-aqueous electrolyte by using filling device 30 is the same as the filling operation described in the second embodiment above, description will not be repeated.

According to the third embodiment, sealed space 202 can be formed around opening portion 108 and stopper body 109 of corresponding secondary battery 20, on the inner surface side of cap body 201. Thus, stopper body 109 can be removed from the opening wall portion within sealed space 202 and corresponding secondary battery 20 can be filled with the refill non-aqueous electrolyte without the refill non-aqueous electrolyte being exposed to the external environment. Therefore, exposure of the refill non-aqueous electrolyte to high humidity can be avoided throughout the operation for filling with the refill non-aqueous electrolyte and hence refill with the non-aqueous electrolyte can be carried out in a low-humidity environment.

In addition, a dehumidifier may be connected to filling portion 204 before connecting filling pipe 205 to filling portion 204. Thus, air within sealed space 202 can be dehumidified and refill with the non-aqueous electrolyte can be carried out in an environment of lower humidity. Alternatively, cap body 201 may include an exhaust portion for coupling to a dehumidifier.

Though description has been provided in the first to third embodiments above with reference to a prismatic lithium ion secondary battery, the secondary battery with filling function and the corresponding secondary battery employed in the present invention are not limited to those of a prismatic shape described above. For example, though an example where opening portion 108 for filling with the refill non-aqueous electrolyte is opposed to a direction of an edge of a stack constituted of positive electrode 105, negative electrode 103 and separator 104 has been described in the first to third embodiments, the direction of the edge of the stack may be oriented in a horizontal direction in FIG. 1. Alternatively, positive electrode 105, negative electrode 103 and separator 104 may be wound, or a cylindrical secondary battery with filling function and a corresponding secondary battery may be employed.

As shown in FIG. 1, however, an example where opening portion 108 is opposed to an edge portion of a stack and a wound structure is preferred because the refill non-aqueous electrolyte supplied through opening portion 108 readily penetrates. In addition, a prismatic secondary battery with filling function and a corresponding secondary battery are preferred to a cylindrical secondary battery with filling function and a corresponding secondary battery, because the former has a greater flat portion suitable for forming opening portion 108.

Figure 10:
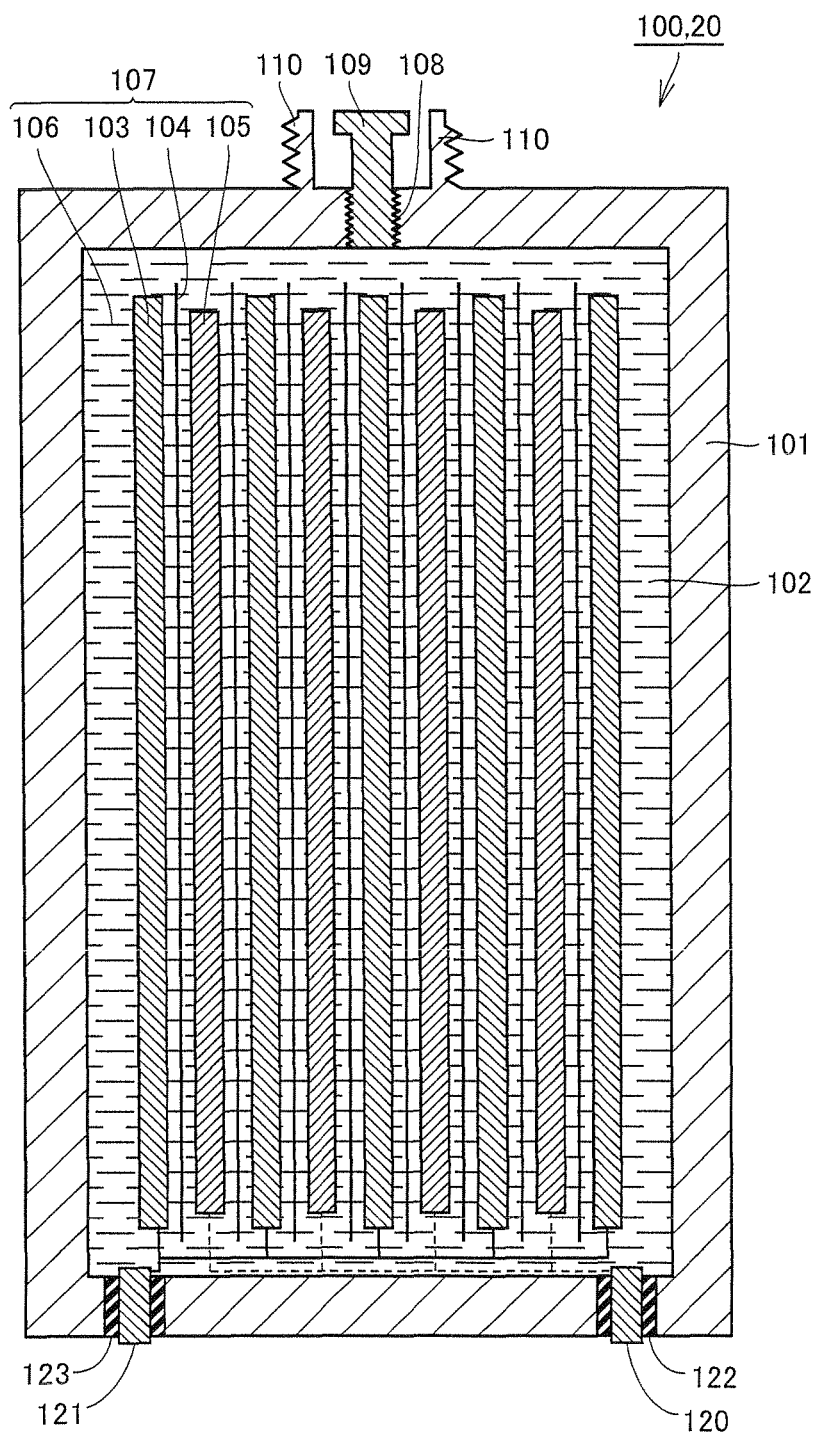
FIG. 10 is a schematic cross-sectional view showing an exemplary arrangement position of a terminal in a corresponding secondary battery.

In addition, though corresponding secondary battery 100, 20 where the positive electrode terminal and the negative electrode terminal are provided in a surface of housing 101 where opening portion 108 is formed is employed in the first and second embodiments, the positive electrode terminal and the negative electrode terminal may be provided in another surface of housing 101. For example, as shown in FIG. 10, each terminal and a current collection lead may be provided in a surface opposed to the surface of housing 101 where opening portion 108 is formed. Here, presence of a terminal does not impose restriction on a structure of opening portion 108, coupling portion 110, filling device 30, and the like. In addition, a high degree of freedom can be obtained also in a filling operation.

Fourth Embodiment

A fourth embodiment relates to an integrated secondary battery with filling function.

<<Structure of Non-Aqueous Electrolyte Secondary Battery>>

Figure 11:
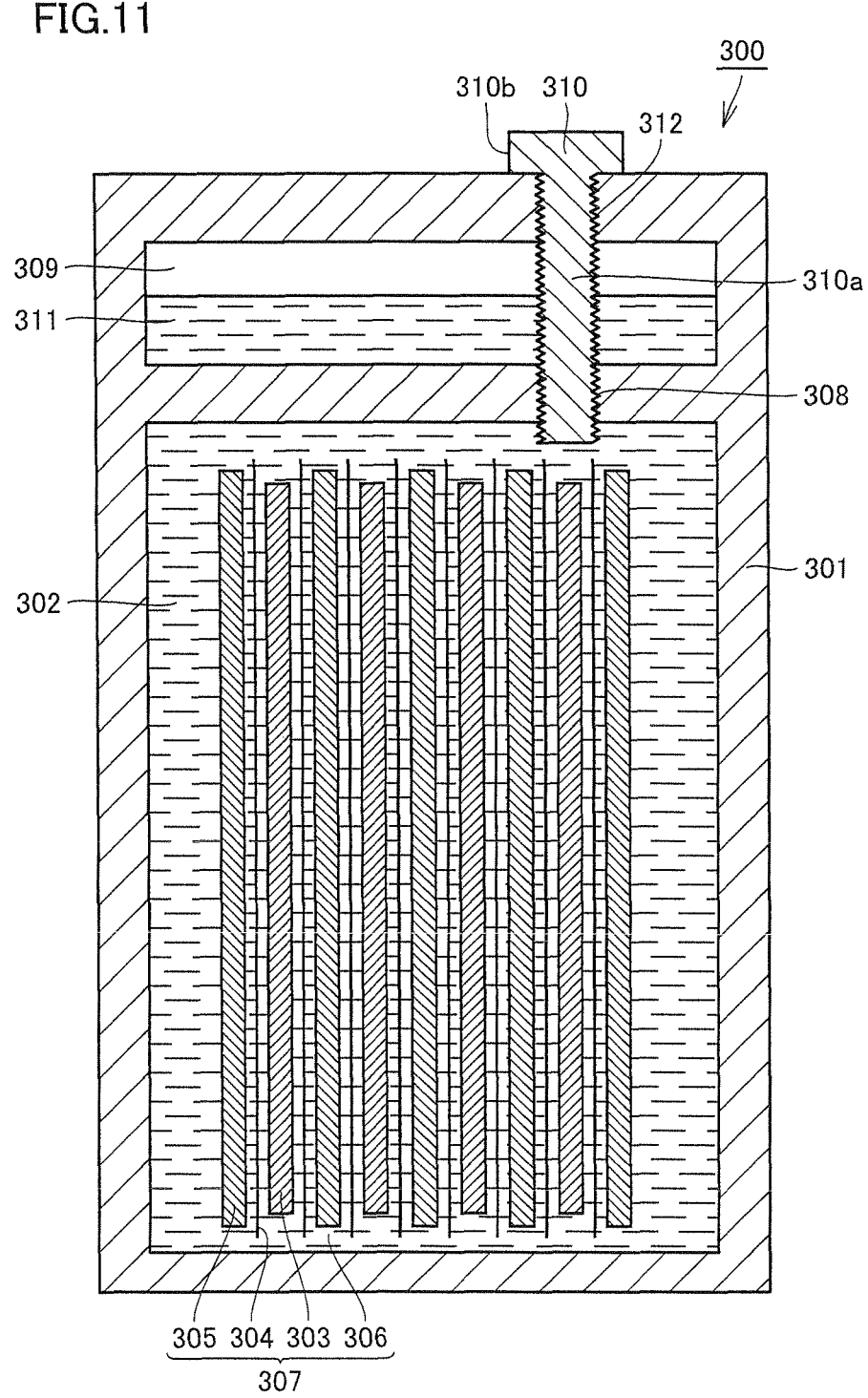
FIG. 11 is a schematic cross-sectional view of a secondary battery with filling function according to a fourth embodiment.

A secondary battery with filling function according to the present embodiment will be described with reference to FIG. 11. In the present embodiment, a prismatic, stack-type lithium ion secondary battery is employed. FIG. 11 is a schematic cross-sectional view of the secondary battery with filling function according to the present embodiment.

In FIG. 11, a secondary battery with filling function 300 includes a housing 301 serving as a casing. In housing 301, an accommodation chamber 302, an opening portion 308 communicating with accommodation chamber 302, and a sub accommodation chamber 309 communicating with accommodation chamber 302 through opening portion 308 are defined. Opening portion 308 causing accommodation chamber 302 and sub accommodation chamber 309 to communicate with each other is closed by a stopper body 310, and a refill non-aqueous electrolyte 311 is accommodated in sub accommodation chamber 309 isolated from accommodation chamber 302.

Sets of a positive electrode 303, a separator 304 and a negative electrode 305 as stacked in this order are accommodated in accommodation chamber 302. In addition, accommodation chamber 302 is filled with a non-aqueous electrolyte 306. Positive electrode 303, separator 304, negative electrode 305, and non-aqueous electrolyte 306 constitute a power generation portion 307.

Each positive electrode 303 and each negative electrode 305 are connected to not-shown positive electrode current collection lead and negative electrode current collection lead within accommodation chamber 302, respectively. A part of each of the positive electrode current collection lead and the negative electrode current collection lead is formed to protrude outward from housing 301, and the protruding portion serves as a positive electrode terminal or a negative electrode terminal of secondary battery with filling function 300.

Positive electrode 303 has such a structure that a positive electrode active substance material is formed on a surface of a current collector. Composite oxide of lithium and transition metal, generally used in a lithium ion secondary battery, can be used as the positive electrode active substance material. In using a large-capacity lithium ion secondary battery of which safety should particularly be high in the present embodiment, a compound having an olivine-type structure is preferably used as a material for positive electrode 303. More specifically, lithium iron phosphate with which decomposition of a non-aqueous electrolyte is less likely and high stability is achieved is preferably used.

Separator 304 plays a role to prevent internal short-circuiting by isolating positive electrode 303 and negative electrode 305 from each other and to maintain ionic conduction between the positive and negative electrodes by holding the non-aqueous electrolyte which is an electrolytic solution. A microporous membrane based on polyolefin such as polyethylene and polypropylene can be used as a material for separator 304. Alternatively, an unwoven fabric made of glass fibers, aramid fibers or cellulose fibers may be employed. Such an unwoven fabric has high thermal stability and thus can improve safety of a battery.

Negative electrode 305 has such a structure that a negative electrode active substance material is formed on a surface of a current collector. A material generally used for the lithium ion secondary battery can be used as the negative electrode active substance material. In particular, a carbon-based material such as graphite excellent in reversibility is preferably employed.

Non-aqueous electrolyte 306, 311 is an electrolytic solution composed of a non-aqueous type organic solvent and lithium salt, which is a lithium ion conductor, and for example, a substance obtained by dissolving $LiPF_6$ in ethylene carbonate, diethyl carbonate or the like can be used. The electrolytic solution may have viscosity.

Stopper body 310 closing opening portion 308 should only be structured to removably be attached to opening portion 308 from the outer side of housing 301. For example, as shown in FIG. 11, the structure can be such that a shaft portion 310a constituting a part of stopper body 310 closes opening portion 308 and a head portion 310b which is another part of stopper body 310 is exposed to the outside of housing 301. Here, stopper body 310 can readily be removed from opening portion 308 by moving head portion 310b of stopper body 310 upward in the figure, and stopper body 310 can readily be inserted in opening portion 308 by moving removed stopper body 310 downward in the figure.

In addition, in an example where head portion 310b is exposed to the outside of housing 301 as in FIG. 11, a sub opening portion 312 is formed in a portion of housing 301 defining sub accommodation chamber 309, and sub opening portion 312 and opening portion 308 are preferably opposed to each other. For example, when sub opening portion 312 is located in a side surface of housing 301 defining sub accommodation chamber 309 and sub opening portion 312 is not opposed to opening portion 308, the shape of stopper body 310 becomes complicated.

A shape of a portion of housing 301 defining opening portion 308 (hereinafter referred to as an "opening wall portion") and a shape of a portion of stopper body 310 coupled to the opening wall portion are not particularly restricted, and any coupling shape capable of isolating accommodation chamber 302 from sub accommodation chamber 309 should only be adopted. For example, as shown in FIG. 11, a helical groove is preferably formed at a position where the opening wall portion and stopper body 310 come in contact with each other. Each of the opening wall portion and stopper body 310 has the helical groove so that screwing to each other can be achieved and hence accommodation chamber 302 can readily be isolated from sub accommodation chamber 309. Alternatively, the opening wall portion and stopper body 310 may have an oblique groove instead of the helical groove, and any shape allowing removable tight fitting to each other should only be adopted.

In addition, in an example where a part of stopper body 310 penetrates sub opening portion 312 to be exposed to the outside of housing 301 as well, a shape of a portion of housing 301 defining sub opening portion 312 (hereinafter referred to as a "sub opening wall portion") and a shape of a portion of stopper body 310 coupled to the sub opening wall portion are not particularly restricted, and any coupling shape capable of isolating sub accommodation chamber 309 from the outside should only be adopted. For example, as shown in FIG. 11, a helical groove is formed at a position where the sub opening wall portion and stopper body 310 come in contact with each other so that screwing to each other can be achieved and hence sub accommodation chamber 309 can readily be isolated from the outside. Alternatively, the sub opening wall portion may have an oblique groove instead of the helical groove, and any shape allowing removable tight fitting to each other should only be adopted.

Figure 12A:
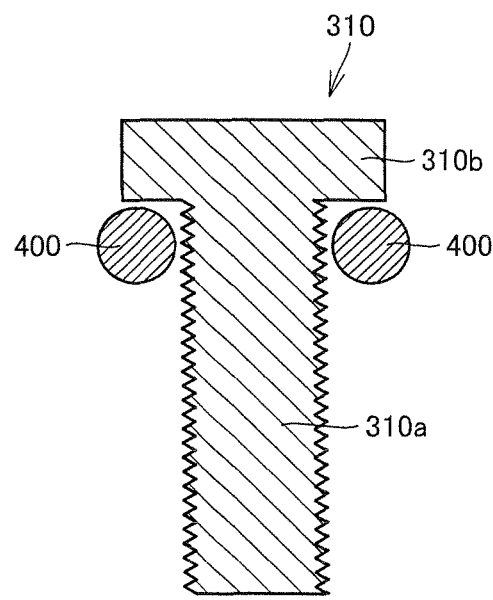
FIGS. 12A and 12B are diagrams for illustrating a shape of a sealing member included in a stopper body.
Figure 12B:
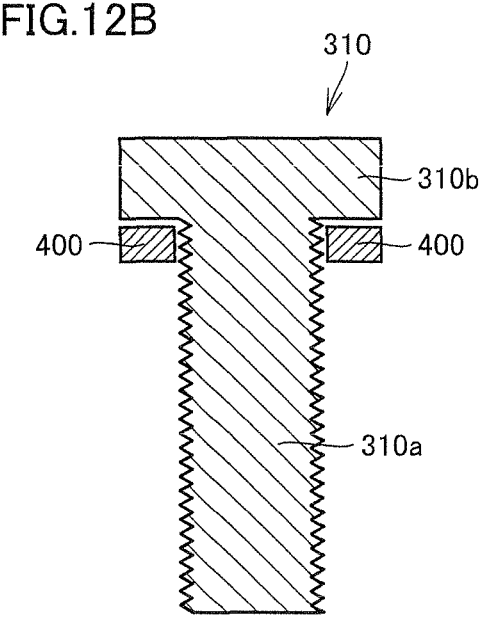

In order to enhance hermeticity in sub accommodation chamber 309, a sealing member for filling a gap between stopper body 310 and sub opening portion 312 is preferably provided. For example, as shown in FIGS. 12A and 12B, an O-ring shaped or rectangular sealing member 400 can be provided at a portion where head portion 310b and shaft portion 310a of stopper body 310 are coupled to each other. Alternatively, sealing member 400 may be provided on a surface of housing 301 on the outer surface side, in the vicinity of sub opening portion 312. It is noted that sealing member 400 for filling a gap between stopper body 310 and opening portion 308 may be provided.

A material resistant to an organic electrolytic solution, such as polypropylene (PP), polyethylene (PE), a copolymer of PP and PE, styrene-butadiene rubber, ethylene propylene diene monomer, butyl rubber, silicone rubber, fluoroplastic-containing rubber, or a Teflon® sealing tape made of polytetrafluoroethylene, is preferred for sealing member 400.

In housing 301, surface(s) where opening portion 308 and/or sub opening portion 312 is (are) formed preferably has (have) an area not smaller than 8 cm$^2$. If surface(s) of housing 301 where opening portion 308 and/or sub opening portion 312 is (are) formed has (have) an area not smaller than 8 cm$^2$, it is not necessary to make opening portion 308, sub opening portion 312 and stopper body 310 too small, which is preferred not only in terms of cost but also in terms of operability in a filling operation.

If the surface(s) where opening portion 308 and/or sub opening portion 312 is (are) formed has (have) an area smaller than 8 cm$^2$, housing 301 may be unable to keep sufficient strength. The surface(s) where opening portion 308 and/or sub opening portion 312 is (are) formed more preferably has (have) an area not smaller than 10 cm$^2$.

More specifically, in an example where housing 301 is prismatic, two adjacent sides of the surface(s) of housing 301 where opening portion 308 and/or sub opening portion 312 is (are) formed preferably have a length not shorter than 1 cm. In an example where housing 301 is cylindrical, the surface(s) of housing 301 where opening portion 308 and/or sub opening portion 312 is (are) formed preferably has (have) a diameter not smaller than 1 cm. A material for housing 301 is not particularly limited, and for example, iron, iron plated with nickel, stainless steel, or aluminum can be employed.

In an example where opening portion 308 and/or sub opening portion 312 and stopper body 310 are screwed to each other, a member of housing 301 of a portion forming opening portion 308 and/or sub opening portion 312, that is, the opening wall portion and/or the sub opening wall portion, preferably has a thickness not smaller than 1.5 mm. If the opening wall portion and/or the sub opening wall portion has (have) a thickness not smaller than 1.5 mm, stopper body 310 in a screw shape can firmly be screwed to opening portion 308 and/or sub opening portion 312 and a hermetic state in accommodation chamber 302 and a hermetic state in sub accommodation chamber 309 can readily be maintained.

In a case where secondary battery with filling function 300 includes a safety valve, it is necessary to avoid removal of stopper body 310 from opening portion 308 until the safety valve is actuated. Therefore, if a safety valve is provided, stopper body 310 closing opening portion 308 is structured such that its withstand pressure is not lower than an operating pressure of the safety valve. It is noted that the withstand pressure herein refers to a pressure up to which stopper body 310 is not removed from opening portion 308.

<<Fabrication of Secondary Battery With Filling Function>>

An exemplary method of fabricating secondary battery with filling function 300 described above will now be described.

Figure 13A:
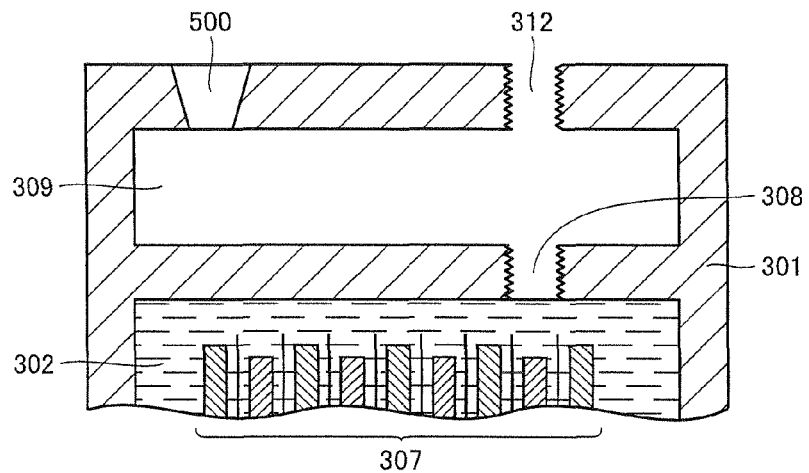
FIGS. 13A to 13C are schematic diagrams showing steps of manufacturing a secondary battery with filling function according to the fourth embodiment.
Figure 13B:
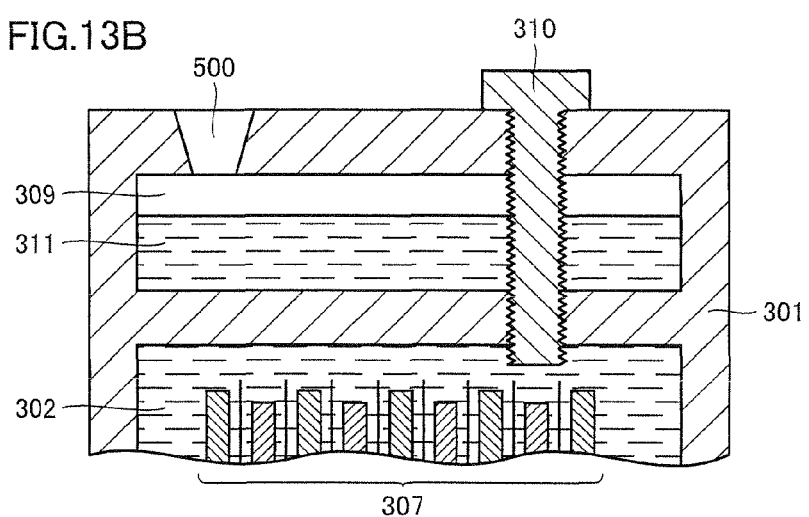
Figure 13C:
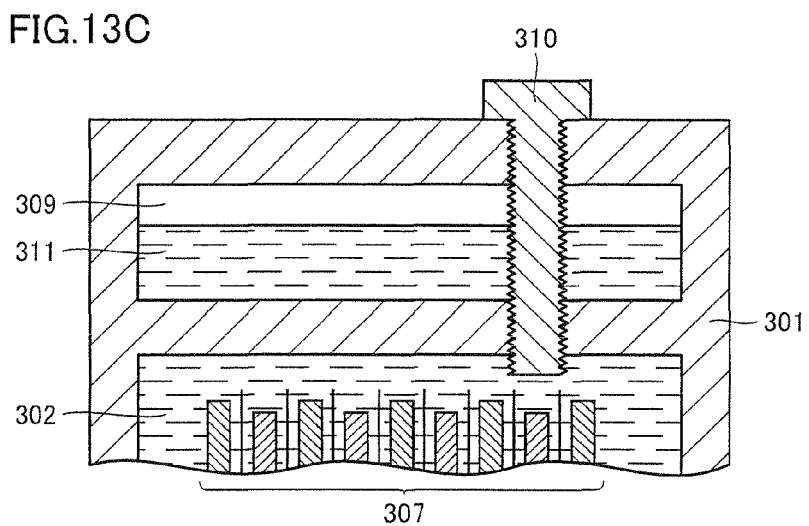

FIGS. 13A to 13C are schematic diagrams showing exemplary steps of manufacturing a secondary battery with filling function according to the fourth embodiment.

Initially, as shown in FIG. 13A, housing 301 in which power generation portion 307 is accommodated in accommodation chamber 302 is prepared. Here, in housing 301, in addition to opening portion 308 and sub opening portion 312, a filling portion 500 for filling sub accommodation chamber 309 with the refill non-aqueous electrolyte is formed.

A method of accommodating power generation portion 307 in accommodation chamber 302 complies with a general method of manufacturing a stack-type lithium ion secondary battery. For example, initially, a stack in which positive electrode 303, separator 304 and negative electrode 305 are stacked in this order is accommodated in accommodation chamber 302 of which bottom surface is open. The bottom surface herein refers to a portion of housing 301 defining accommodation chamber 302, which is a lowermost surface of secondary battery with filling function 300 in FIG. 11.

Then, each positive electrode 303 and each negative electrode 305 accommodated in accommodation chamber 302 are connected to the positive electrode terminal and the negative electrode terminal through not-shown positive electrode current collection lead and negative electrode current collection lead, respectively. The positive electrode terminal and the negative electrode terminal are provided to penetrate a member constituting the bottom surface of accommodation chamber 302. This member and housing 301 of which bottom surface is open are laser-welded, to thereby form accommodation chamber 302.

According to this accommodation method, housing 301 defining accommodation chamber 302 having the positive electrode terminal and the negative electrode terminal in the bottom surface is formed. Thereafter, accommodation chamber 302 is filled with non-aqueous electrolyte 306 through sub opening portion 312 and opening portion 308, to thereby fabricate housing 301 having accommodation chamber 302 accommodating power generation portion 307 and empty sub accommodation chamber 309 as shown in FIG. 13A.

Then, as shown in FIG. 13B, stopper body 310 is turned and moved downward from above in the figure, so that stopper body 310 is fitted to the sub opening wall portion and to the opening wall portion. Thus, opening portion 308 is closed and accommodation chamber 302 is isolated from sub accommodation chamber 309. Then, sub accommodation chamber 309 is filled with refill non-aqueous electrolyte 311 through filling portion 500.

Then, as shown in FIG. 13C, filling portion 500 is laser-sealed. Thus, sub accommodation chamber 309 is isolated from the outside, to thereby manufacture secondary battery with filling function 300 in FIG. 11.

<<Operation for Filling Secondary Battery with Filling Function with Refill Non-Aqueous Electrolyte>>

An operation for filling with a refill non-aqueous electrolyte using secondary battery with filling function 300 described above will now be described.

Figure 14:
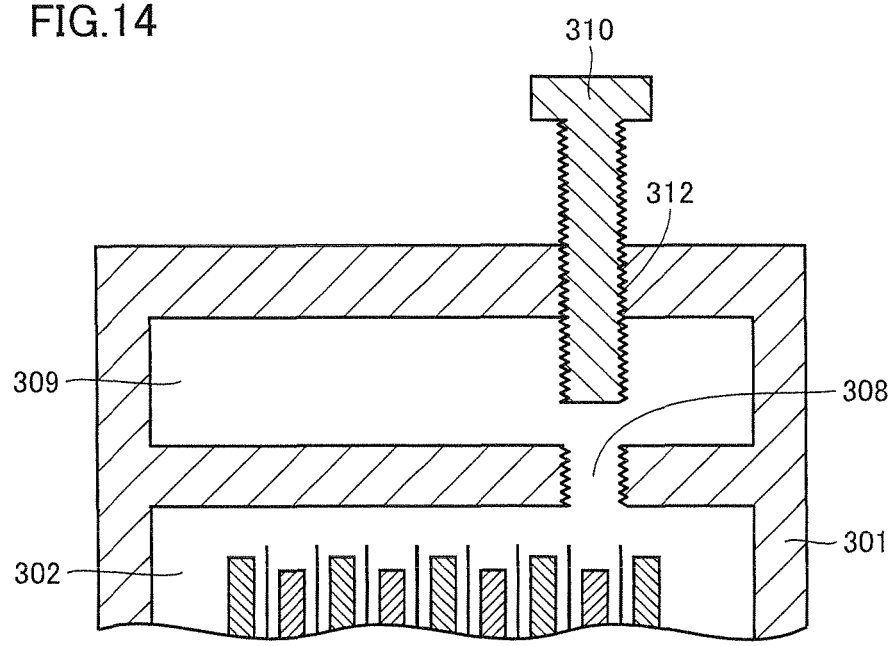
FIG. 14 is a diagram for illustrating an operation for filling the secondary battery with filling function according to the fourth embodiment with a refill non-aqueous electrolyte.

Initially, in secondary battery with filling function 300 shown in FIG. 11, stopper body 310 is turned and moved upward in the figure, to open opening portion 308 as shown in FIG. 14. As opening portion 308 is opened, accommodation chamber 302 is filled with non-aqueous electrolyte 311 accommodated in sub accommodation chamber 309. Here, in an example where the opening wall portion and stopper body 310 are screwed to each other as shown in FIG. 11, opening portion 308 can gradually be opened, and hence transfer of non-aqueous electrolyte 311 to accommodation chamber 302 becomes smooth. It is noted that the non-aqueous electrolyte is not shown in FIG. 14.

After refill of accommodation chamber 302 with non-aqueous electrolyte 311 is completed, stopper body 310 is turned and moved downward in the figure, to thereby close opening portion 308. Through the operation above, accommodation chamber 302 can be refilled with non-aqueous electrolyte 311, without the non-aqueous electrolyte being exposed to the external environment.

As described above, according to the present embodiment, accommodation chamber 302 can be filled with non-aqueous electrolyte 311 accommodated in advance in sub accommodation chamber 309 isolated from the outside, through opening portion 308, without the non-aqueous electrolyte being exposed to the external environment, that is, in a low-humidity environment. It is noted that a structure for isolating accommodation chamber 302 and sub accommodation chamber 309 from each other and a structure for isolating sub accommodation chamber 309 and the outside from each other are simple and such a problem as increase in cost, footprint or the like does not arise.

In addition, an amount of non-aqueous electrolyte 311 to be accommodated in sub accommodation chamber 309 may be an amount for one dose of refill or an amount for several doses of refill. If several doses of the refill non-aqueous electrolyte are accommodated, it is necessary to count in advance a time or the like required for filling with one dose of the refill non-aqueous electrolyte and to count a time period during which opening portion 308 is to be opened for refill.

Moreover, a plurality of sub accommodation chambers 309 may be provided. For example, in secondary battery with filling function 300 in FIG. 11, housing 301 may have another sub accommodation chamber communicating with sub accommodation chamber 309 through sub opening portion 312. Here, stopper body 310 can be structured to penetrate opening portion 308 and sub opening portion 312 as well as a portion of the housing defining another sub accommodation chamber to be exposed to the outside of housing 301. According to such a structure, even after accommodation chamber 302 is completely filled with the non-aqueous electrolyte within sub accommodation chamber 309 by opening opening portion 308, accommodation chamber 302 can be filled with the non-aqueous electrolyte accommodated in another sub accommodation chamber successively through sub opening portion 312, sub accommodation chamber 309 and opening portion 308, by opening sub opening portion 312.

Further, secondary battery with filling function 300 according to the present embodiment may include a supply portion for filling sub accommodation chamber 309 with the refill non-aqueous electrolyte. An example thereof will be shown below with reference to FIG. 15.

Figure 15:
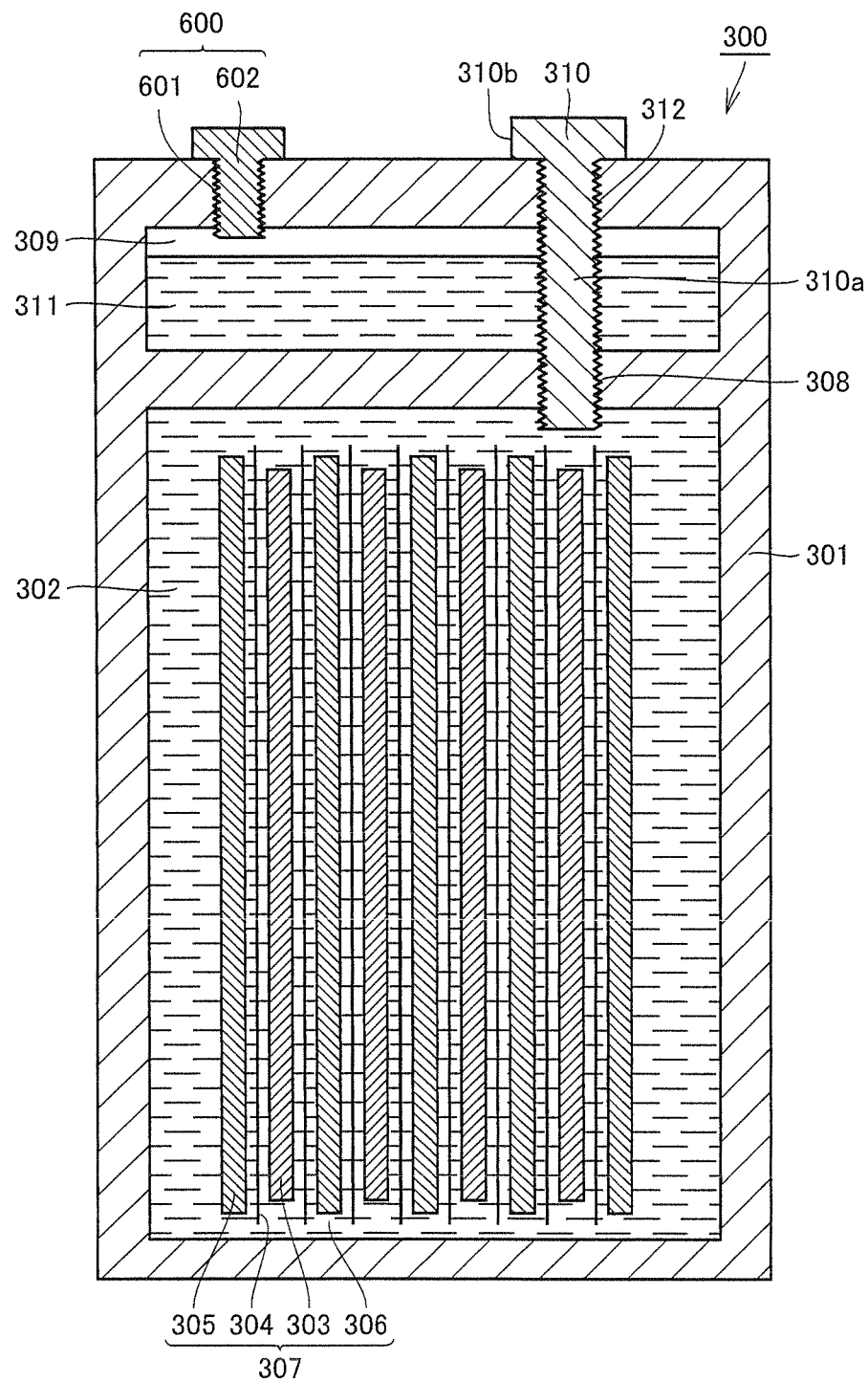
FIG. 15 is a schematic cross-sectional view of a secondary battery with filling function including a supply portion.

FIG. 15 is a schematic cross-sectional view of a non-aqueous electrolyte secondary battery including the supply portion. As shown in FIG. 15, a supply portion 600 can have a supply port portion 601 formed in a portion of housing 301 defining sub accommodation chamber 309, for causing sub accommodation chamber 309 and the outside of housing 301 to communicate with each other, and a supply port stopper body 602 removably closing supply port portion 601. According to this structure, since sub accommodation chamber 309 can be filled with the refill non-aqueous electrolyte, life of secondary battery with filling function 300 can be extended. The structure of supply portion 600 is not limited to that in FIG. 15, and any structure allowing supply of the non-aqueous electrolyte to sub accommodation chamber 309 may be adopted.

In a general non-aqueous electrolyte secondary battery not having a sub accommodation chamber, there is no concept of external refill with a non-aqueous electrolyte, and external refill with the non-aqueous electrolyte could not be carried out when a discharge capacity lowered due to what is called exhaustion of a solution in which the non-aqueous electrolyte decreases. In addition, a battery should be manufactured in such an environment that a dew point temperature is not higher than −40° C. and an amount of moisture is not greater than 0.013%, and a low-humidity environment is required also in refill with the non-aqueous electrolyte. Such a requirement could not be met naturally by a general non-aqueous electrolyte secondary battery and even by a structure of a lithium ion secondary battery disclosed in Japanese Patent Laying-Open No. 2001-210309.

In contrast, since a secondary battery with filling function as shown in FIG. 15 can accommodate the non-aqueous electrolyte in advance in sub accommodation chamber 309, a filling operation can be performed while an internal environment of the battery is maintained without being affected by the external environment during external filling of sub accommodation chamber 309 with the non-aqueous electrolyte. Therefore, for example, not only in the operation for filling accommodation chamber 302 with the non-aqueous electrolyte that has been stored in sub accommodation chamber 309 in manufacturing of secondary battery with filling function 300 but also in the operation for filling sub accommodation chamber 309 with the non-aqueous electrolyte for the second time and later, refill in a low-humidity environment can be carried out.

Though description has been provided in the fourth embodiment with reference to a prismatic lithium ion secondary battery, the secondary battery with filling function employed in the present invention is not limited to that of a prismatic shape described above. For example, though an example where opening portion 308 for filling with the refill non-aqueous electrolyte is opposed to a direction of an edge of a stack constituted of positive electrode 303, negative electrode 305 and separator 304 has been described in the fourth embodiment, the direction of the edge of the stack may be oriented in a horizontal direction in FIG. 11. Alternatively, positive electrode 303, negative electrode 305 and separator 304 may be wound, or a cylindrical secondary battery with filling function may be employed.

As shown in FIG. 11, however, an example where opening portion 308 is opposed to an edge portion of a stack and a wound structure is preferred because the refill non-aqueous electrolyte supplied through opening portion 308 readily penetrates. In addition, a prismatic secondary battery with filling function is preferred to a cylindrical secondary battery with filling function, because the former has a greater flat portion suitable for forming opening portion 308.

According to the present invention described above with reference to the first to fourth embodiments, for example, in automobile inspection of an electric car (such as an HEV or an EV) including a non-aqueous electrolyte secondary battery, refill with a non-aqueous electrolyte can be carried out in a simplified manner in a low-humidity environment and therefore the battery in an automobile inspection factory can be recycled. In addition, for example, a non-aqueous electrolyte secondary battery used in a power storage system in photovoltaic power generation or wind power generation can be recycled on site, without reclaiming the non-aqueous electrolyte back to the factory. Moreover, in refill with the non-aqueous electrolyte, it is not necessary to use special facilities or an apparatus such as a glove box or a dry room and an operation can be performed using a jig, a tool or the like normally used by an operator in an automobile inspection factory, a photovoltaic power plant, and a wind power plant.

EXAMPLES

Example 1

Studies were conducted by using secondary battery with filling function 10 shown in FIG. 1.
<Fabrication of Corresponding Secondary Battery>
1. Fabrication of Positive Electrode
Slurry was prepared by mixing 90 parts by weight $LiFePO_4$ which is an active material, 5 parts by weight acetylene black which is a conductive material, and 5 parts by weight polyvinylidene fluoride which is a binder and adding thereto as appropriate N-methyl-2-pyrrolidone serving as a solvent to disperse the materials therein. The slurry was uniformly applied to opposing surfaces of an aluminum current collector having a thickness of 20 μm, followed by drying. Then, 32 plate-shaped positive electrodes 105 were fabricated by pressing the dried aluminum current collector with a roll press and cutting the current collector into a size of 140 mm long×250 mm wide. Positive electrode 105 had a thickness of 230 μm. An aluminum current collection lead was welded to each positive electrode 105.
2. Fabrication of Negative Electrode
Slurry was prepared by mixing 90 parts by weight natural graphite which is an active material and 10 parts by weight polyvinylidene fluoride which is a binder and adding thereto as appropriate N-methyl-2-pyrrolidone serving as a solvent to disperse the materials therein. The slurry was uniformly applied to opposing surfaces of a copper current collector having a thickness of 16 μm, followed by drying. Then, 33 plate-shaped negative electrodes 103 were fabricated by pressing the dried copper current collector with a roll press and cutting the current collector into a size of 142 mm long× 250 mm wide. Negative electrode 103 had a thickness of 146 μm. A nickel current collection lead was welded to each negative electrode 103.
3. Fabrication of Separator
Sixty-four separators 104 were fabricated by cutting a microporous polyethylene film having a thickness of 25 μm into a size of 145 mm long×255 mm wide.
4. Fabrication of Non-Aqueous Electrolyte
Two-hundred and fifty ml non-aqueous electrolyte 106 was prepared by mixing ethylene carbonate and diethyl carbonate at a volume ratio of 30:70 and dissolving $LiPF_6$ in this liquid mixture such that concentration of $LiPF_6$ is 1 mol/L.
5. Fabrication of Corresponding Secondary Battery 20
A stack in which positive electrode 105, separator 104 and negative electrode 103 were stacked in this order was accommodated in the housing of which upper surface was open and then filling with 200 ml non-aqueous electrolyte 106 was carried out. Then, corresponding secondary battery 20 including housing 101 in which power generation portion 107 was accommodated in accommodation chamber 102 shown in FIG. 1 was fabricated by arranging an upper surface member including opening portion 108, coupling portion 110 and stopper body 109 on the upper surface of the housing and laser-sealing the housing and the upper surface member. It is noted that a method of manufacturing corresponding secondary battery 20 complies with a general method of manufacturing a prismatic, stack-type lithium ion secondary battery.

In corresponding secondary battery 20 fabricated as described above, an outer dimension of a box-shaped portion of housing 101 was 20 mm long×150 mm wide×300 mm high. A dimension of the upper surface of housing 101, that is, the surface where opening portion 108 was formed, was 20 mm long×150 mm wide, and the shaft portion of stopper body 109 had a diameter of 3 mm. In addition, the upper surface of housing 101 had a thickness of 0.5 mm, and adjustment was made by stacking a reinforcement plate having a thickness of 1.0 mm on the upper surface such that an upper surface portion had a thickness of 1.5 mm.
<Initial Battery Performance>
Initial battery performance of fabricated corresponding secondary battery 20 was measured. A nominal voltage was 3.2 V and an internal resistance was 3 mΩ. A discharge capacity after charging for 6 hours at constant current/constant voltage of 10 A/3.8 V and discharge at 10 A to 2.25 V under such a condition as an atmospheric temperature of 25° C. was 50 Ah.
<Charge and Discharge Cycle Test>
Cycle tests were conducted by using fabricated corresponding secondary battery 20, under the condition of an atmospheric temperature of 25° C. and the condition the same as the charge and discharge condition at the time of measurement of the discharge capacity above. When the number of cycles attained to 1500, the discharge capacity was lower than 70% of the initial discharge capacity.
<Refill with Non-Aqueous Electrolyte>
In order to attach filling device 30 to corresponding secondary battery 20 of which discharge capacity was lower than 70% of the initial discharge capacity, coupling portion 110 of corresponding secondary battery 20 and cap body 201 of filling device 30 were coupled to each other. By attaching filling device 30 to corresponding secondary battery 20, secondary battery with filling function 10 according to the first embodiment was formed. Then, a rotary pump was connected to filling portion 204 and sealed space 202 formed in cap body 201 was evacuated to 0.1 kPa. Thereafter, a nitrogen gas was introduced to return to an atmospheric pressure.

Then, stopper body 109 was removed from opening portion 108 by operating attachment and removal portion 203 as shown in FIGS. 5A to 5C. Then, filling pipe 205 was inserted in filling portion 204 in place of the rotary pump and sealed space 202 was filed with 20 ml refill non-aqueous electrolyte through filling pipe 205. The non-aqueous electrolyte fabricated as described above was used as the refill non-aqueous electrolyte.

After attachment and removal portion 203 moved stopper body 109 to insert stopper body 109 into the opening wall portion, filling device 30 was removed from corresponding secondary battery 20. In the present example, coupling between coupling portion 110 and cap body 201 and coupling between stopper body 109 and the opening wail portion were each achieved by screwing.
<Battery Performance After Refill>
After corresponding secondary battery 20 refilled with the non-aqueous electrolyte as described above was left at room temperature for 24 hours, cycle tests were conducted twice under the condition the same as the charge and discharge condition at the time of measurement of the discharge capacity above at an atmospheric temperature of 25° C. Then, the discharge capacity of corresponding secondary battery 20 was measured with the method above, and it was found that the discharge capacity after refill was 47 Ah and recovery to 94% in the first cycle was achieved.

Example 2

Studies the same as in Example 1 were conducted, with an amount of the refill non-aqueous electrolyte being set to 10 ml. Then, it was found that the discharge capacity after refill was 45 Ah with respect to the initial discharge capacity of 50 Ah and recovery to 90% in the first cycle was achieved.

Example 3

Studies the same as in Example 1 were conducted, with an amount of the refill non-aqueous electrolyte being set to 50 ml. Then, it was found that the discharge capacity after refill was 48 Ah with respect to the initial discharge capacity of 50 Ah and recovery to 96% in the first cycle was achieved.

Example 4

A cylindrical corresponding secondary battery obtained by winding elongated positive and negative electrodes and separators together was fabricated and studies the same as in Example 1 were conducted. Then, the similar effects were obtained.

Example 5

Studies were conducted by using secondary battery with filling function 300 shown in FIG. 11.
<Fabrication of Secondary Battery with Filling Function>
1. Fabrication of Positive Electrode
Thirty-two positive electrodes 303 were fabricated with the method the same as the method of fabricating positive electrodes 105.
2. Fabrication of Negative Electrode
Thirty-three negative electrodes 305 were fabricated with the method the same as the method of fabricating negative electrodes 103.
3. Fabrication of Separator
Sixty-four separators 304 were fabricated with the method the same as the method of fabricating separators 104.
4. Fabrication of Non-Aqueous Electrolyte
Two-hundred and fifty ml non-aqueous electrolyte 306 was prepared with the method the same as the method of fabricating non-aqueous electrolyte 106.
5. Fabrication of Secondary Battery with Filling Function 300
A stack in which fabricated positive electrode 303, separator 304 and negative electrode 305 were stacked in this order and negative electrode 305 was located as an outermost layer was accommodated in accommodation chamber 302 of which bottom surface was open. Then, according to the conventional accommodation method, a member forming the bottom surface of accommodation chamber 302 and housing 301 were laser-welded to each other, so that housing 301 defining accommodation chamber 302 having a positive electrode terminal and a negative electrode terminal in the bottom surface was formed. Thereafter, accommodation chamber 302 was filled with 200 ml non-aqueous electrolyte 306 through sub opening portion 312 and opening portion 308, to thereby fabricate housing 301 having accommodation chamber 302 accommodating power generation portion 307 and empty sub accommodation chamber 309 as shown in FIG. 13A.
Thereafter, as shown in FIG. 13B, after stopper body 310 is fitted to sub opening portion 312 and opening portion 308 to isolate accommodation chamber 302 from sub accommodation chamber 309, sub accommodation chamber 309 was filled with 30 ml fabricated non-aqueous electrolyte 306 as non-aqueous electrolyte 311, through filling portion 500. Thereafter, tilling portion 500 was laser-sealed to isolate sub accommodation chamber 309 from the outside of housing 301.

In secondary battery with filling function 300 fabricated as described above, an outer dimension of a box-shaped housing 301 was 20 mm long×150 mm wide×320 mm high. A dimension of the upper surface of housing 301, that is, the surface where sub opening portion 312 was formed, was 20 mm long×150 mm wide, and the shaft portion of stopper body 310 had a diameter of 3 mm. In addition, the upper surface of housing 301 had a thickness of 0.5 mm, and adjustment was made by stacking a reinforcement plate on the upper surface such that an upper surface portion had a thickness of 1.0 mm. Moreover, a dimension of a portion isolating accommodation chamber 302 and sub accommodation chamber 309 from each other, that is, the surface where opening portion 308 was formed, was 20 mm long×150 mm wide, and 1.5 mm thick.

<Initial Battery Performance>
Initial battery performance of fabricated secondary battery with filling function 300 was measured. A nominal voltage was 3.2 V and an internal resistance was 3 mΩ A discharge capacity after charging for 6 hours at constant current/constant voltage of 10 A/3.8 V and discharge at 10 A to 2.25 V under such a condition as an atmospheric temperature of 25° C. was 50 Ah.

<Charge and Discharge Cycle Test>
Cycle tests were conducted by using fabricated secondary battery with filling function 300, under the condition of an atmospheric temperature of 25° C. and the condition the same as the charge and discharge condition at the time of measurement of the discharge capacity above. When the number of cycles attained to 1500, the discharge capacity was lower than 70% of the initial discharge capacity.

<Refill with Non-Aqueous Electrolyte>
In secondary battery with filling function 300 of which discharge capacity was lower than 70% of the initial discharge capacity, opening portion 308 was opened by moving stopper body 310 so as to fill accommodation chamber 302 with 30 ml non-aqueous electrolyte 311 accommodated in sub accommodation chamber 309, through opening portion 308. Thus, power generation portion 307 was refilled with 30 ml non-aqueous electrolyte 311. After completion of refill, stopper body 310 was placed back to the original position to close opening portion 308, <Battery Performance After Refill>
After secondary battery with filling function 300 refilled with the non-aqueous electrolyte as described above was left at room temperature for 24 hours, cycle tests were conducted twice under the condition the same as the charge and discharge condition at the time of measurement of the discharge capacity above at an atmospheric temperature of 25° C. Then, the discharge capacity of secondary battery with filling function 300 was measured with the method above, and it was found that the discharge capacity after refill was 47 Ah and recovery to 94% in the first cycle was achieved.

Example 6

Studies the same as in Example 5 were conducted, with an amount of the refill non-aqueous electrolyte being set to 10 ml. Then, it was found that the discharge capacity after refill was 44.9 Ah with respect to the initial discharge capacity of 50 Ah and recovery to 89.8% in the first cycle was achieved.

Example 7

Studies the same as in Example 5 were conducted, with an amount of the refill non-aqueous electrolyte being set to 50 ml. Then, it was found that the discharge capacity after refill was 48.1 Ah with respect to the initial discharge capacity of 50 Ah and recovery to 96.2% in the first cycle was achieved.

Example 8

A cylindrical secondary battery with filling function obtained by winding elongated positive and negative electrodes and separators together was fabricated and studies the same as in Example 5 were conducted. Then, the similar effects were obtained.

It was found from the results above that the discharge capacity could be recovered to 89.8% or higher by refilling the lithium ion secondary battery of which discharge capacity lowered to 70% or lower of the initial discharge capacity with the non-aqueous electrolyte as much as 5 to 25% of the initial amount of the non-aqueous electrolyte (200 ml) and that life of the lithium ion secondary battery could consequently be extended.

The present invention can suitably be utilized for refill with a non-aqueous electrolyte. In particular, the present invention can suitably be utilized for refilling a medium- and large-sized non-aqueous electrolyte secondary battery, which is difficult to move into a glove box, with a non-aqueous electrolyte.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A non-aqueous electrolyte secondary battery with filling function, comprising:
    a housing having an accommodation chamber for accommodating a power generation portion having a positive electrode, a negative electrode, a separator, and a non-aqueous electrolyte, an opening portion communicating with said accommodation chamber, and a sub accommodation chamber communicating with said accommodation chamber through said opening portion, for accommodating a refill non-aqueous electrolyte; and
    a stopper body structured to removably be attached to said opening portion from an outer side of said housing; wherein
    a sub opening portion causing said sub accommodation chamber and outside of said housing to communicate with each other is formed in a portion of said housing defining said sub accommodation chamber,
    a part of said stopper body is removably fitted to said opening portion and another part of said stopper body is exposed to the outside of said housing through said sub opening portion, and
    in the case where the part of said stopper body closes said opening portion and said sub accommodation chamber and said accommodation chamber are isolated from each other and isolated from an external environment, the another part of said stopper body is exposed to the outside of said housing through said sub opening portion.

2. The non-aqueous electrolyte secondary battery with filling function according to claim 1, wherein
    said opening portion and said sub opening portion are opposed to each other.

3. The non-aqueous electrolyte secondary battery with filling function according to claim 1, wherein
    a portion of said housing defining said opening portion and said stopper body are screwed to each other.

4. The non-aqueous electrolyte secondary battery with filling function according to claim 1, wherein
    a portion of said housing defining said sub opening portion and said stopper body are screwed to each other.

5. The non-aqueous electrolyte secondary battery with filling function according to claim 1, wherein
    a supply portion for filling said sub accommodation chamber with the refill non-aqueous electrolyte from outside of said housing is formed in a portion of said housing defining said sub accommodation chamber.

6. The non-aqueous electrolyte secondary battery with filling function according to claim 5, wherein
    said supply portion has a supply port portion communicating with said sub accommodation chamber to cause said sub accommodation chamber and the outside of said housing to communicate with each other and a supply port stopper body removably fitted to said supply port portion.

7. The non-aqueous electrolyte secondary battery with filling function according to claim 6, wherein
    a portion of said housing defining said supply port portion and said supply port stopper body are screwed to each other.

* * * * *